(12) United States Patent
Ibaragi et al.

(10) Patent No.: US 11,623,432 B2
(45) Date of Patent: Apr. 11, 2023

(54) METAL-FIBER-REINFORCED RESIN MATERIAL COMPOSITE AND PRODUCTION METHOD THEREOF

(71) Applicant: NIPPON STEEL CORPORATION, Tokyo (JP)

(72) Inventors: Masaharu Ibaragi, Tokyo (JP); Noriyuki Negi, Tokyo (JP); Masafumi Usui, Tokyo (JP); Masako Nakai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 210 days.

(21) Appl. No.: 16/756,401

(22) PCT Filed: Dec. 28, 2018

(86) PCT No.: PCT/JP2018/048614
§ 371 (c)(1),
(2) Date: Apr. 15, 2020

(87) PCT Pub. No.: WO2019/132043
PCT Pub. Date: Jul. 4, 2019

(65) Prior Publication Data
US 2021/0187908 A1 Jun. 24, 2021

(30) Foreign Application Priority Data
Dec. 28, 2017 (JP) .............................. JP2017-254695

(51) Int. Cl.
*B32B 15/08* (2006.01)
*B32B 15/01* (2006.01)
(Continued)

(52) U.S. Cl.
CPC ............ *B32B 15/08* (2013.01); *B32B 15/013* (2013.01); *B32B 15/016* (2013.01); *B32B 15/18* (2013.01);
(Continued)

(58) Field of Classification Search
CPC ................ B32B 15/20; B32B 2255/06; B32B 2255/205; B32B 2260/021;
(Continued)

(56) References Cited

U.S. PATENT DOCUMENTS 6,468,613 B1    10/2002 Kitano et al.
2011/0008644 A1   1/2011 Naritomi et al.
(Continued)

FOREIGN PATENT DOCUMENTS

CN    110121413 A    8/2019
JP    8-277336 A     10/1996
(Continued)

OTHER PUBLICATIONS

Tanaka, "Infrared Specteroscopy," Journal of the Society of Color Materials, vol. 63, No. 10, 1990, pp. 622-632.
(Continued)

*Primary Examiner* — Lawrence D Ferguson
(74) *Attorney, Agent, or Firm* — Birch, Stewart, Kolasch & Birch, LLP

(57) ABSTRACT

[Problem]
A metal-fiber reinforced resin material composite is provided which improves the shear strength between a metallic member and a fiber reinforced material by more strongly bonding the metallic member and the fiber reinforced resin member, and which is very light and has excellent workability while increasing strength.

[Solution]
This metal-fiber reinforced resin material composite is provided with a metallic member and with a fiber reinforced
(Continued)

resin material that is stacked on at least one surface of the metallic member and combined with the metallic member, wherein the fiber reinforced resin material comprises a matrix resin containing a thermoplastic resin, a reinforcing fiber material included in the matrix resin, and a resin layer interposed between the reinforcing fiber material and the metallic member and comprising a resin of the same type as the matrix resin. The shear strength of the metallic member and the fiber reinforced resin material is greater than or equal to 0.8 MPa.

17 Claims, 12 Drawing Sheets

(51) Int. Cl.
    *B32B 15/18*     (2006.01)
    *B32B 15/20*     (2006.01)
    *B32B 27/28*     (2006.01)
    *C08J 5/04*     (2006.01)
    *C08J 5/24*     (2006.01)
    *C23C 2/12*     (2006.01)

(52) U.S. Cl.
    CPC ............ *B32B 15/20* (2013.01); *B32B 27/285* (2013.01); *C08J 5/042* (2013.01); *C08J 5/24* (2013.01); *C23C 2/12* (2013.01); *B32B 2260/021* (2013.01); *B32B 2305/076* (2013.01); *B32B 2311/24* (2013.01); *B32B 2311/30* (2013.01); *B32B 2313/04* (2013.01); *B32B 2371/00* (2013.01); *C08J 2363/00* (2013.01); *C08J 2371/10* (2013.01)

(58) Field of Classification Search
    CPC ...... B32B 2260/046; B32B 2262/0269; B32B 2262/10; B32B 2262/101; B32B 2262/105; B32B 2262/106; B32B 2305/076; B32B 2307/51; B32B 2307/54; B32B 2307/542; B32B 2307/546; B32B 2307/732; B32B 2311/24; B32B 2311/30; B32B 2313/04; B32B 2371/00; B32B 2605/08; B32B 27/12; B32B 27/285; B32B 27/286; B32B 27/288; B32B 27/302; B32B 27/304; B32B 27/32; B32B 27/34; B32B 27/365; B32B 27/38; B32B 5/024; B32B 7/12; C08J 2323/12; C08J 2363/00; C08J 2369/00; C08J 2371/10; C08J 2377/00; C08J 2463/02; C08J 2471/10; C08J 5/042; C08J 5/24

See application file for complete search history.

(56) References Cited

U.S. PATENT DOCUMENTS

| | | |
|---|---|---|
| 2015/0298368 A1 | 10/2015 | Krahnert et al. |
| 2015/0321392 A1 | 11/2015 | Stapperfenne et al. |
| 2017/0241074 A1 | 8/2017 | Ono et al. |
| 2018/0079879 A1 | 3/2018 | Otsuki et al. |
| 2021/0107269 A1 | 4/2021 | Takahashi et al. |
| 2021/0129488 A1 | 5/2021 | Takahashi et al. |

FOREIGN PATENT DOCUMENTS

| | | |
|---|---|---|
| JP | 2004-249641 A | 9/2004 |
| JP | 2011-240620 A | 12/2011 |
| JP | 2012-92158 A | 5/2012 |
| JP | 2013-40299 A | 2/2013 |
| JP | 2015-212085 A | 11/2015 |
| JP | 2015-536850 A | 12/2015 |
| JP | 2016-3257 A | 1/2016 |
| JP | 5999721 B2 | 9/2016 |
| KR | 2000-0068796 A | 11/2000 |
| WO | WO 2009/116484 A1 | 9/2009 |
| WO | WO 2016/152856 A1 | 9/2016 |
| WO | WO 2017/090676 A1 | 6/2017 |
| WO | WO 2018/124215 A1 | 7/2018 |
| WO | WO 2018/182038 A1 | 10/2018 |

OTHER PUBLICATIONS

Chinese Office Action and Search Report for corresponding Chinese Application No. 201880083911.1, dated May 11, 2022, with an English translation.

Tong Zhangfa, "Utility Adhesive Production Formulations and Use Techniques," Jiangxi Science and Technology Press, 1st Edition, Jul. 31, 2002, p. 73, 3 pages total.

You Min, "Metallic Structural Gluing," Wuhan University of Hydraulic and Electric Engineering Press, 1st Edition, Sep. 30, 2000, pp. 47-51, 7 pages total.

METAL-FIBER-REINFORCED RESIN MATERIAL COMPOSITE AND PRODUCTION METHOD THEREOF

TECHNICAL FIELD

The present invention relates to a metal-fiber-reinforced resin material composite in which a metallic member and a fiber-reinforced resin material are laminated and integrated, and a production method thereof.

BACKGROUND ART

Fiber reinforced plastics (FRP: Fiber Reinforced Plastics) in which reinforcing fibers (eg, glass fibers, carbon fibers, etc.) are contained in a matrix resin to form a composite, are lightweight and have excellent tensile strength and workability. Therefore, they are widely used from the consumer sector to industrial applications. In the automotive industry, the application of FRP to automotive members is being studied, focusing on the lightness, tensile strength, workability, etc. of FRP in order to meet the need for a lighter vehicle body that leads to improved fuel efficiency and other performance.

When the FRP itself is used as an automobile member, there are various problems. First, at the time of painting or bending, existing equipment such as a painting line or a bending mold provided for a metallic member such as a steel material cannot be directly used for FRP. Second, since FRP has low compressive strength, it is difficult to use FRP as it is for an automobile member requiring high compressive strength. Third, since the FRP matrix resin is generally a thermosetting resin such as an epoxy resin and thus has brittleness, there is a likelihood of brittle fracture when it is deformed. Fourth, FRP (particularly, Carbon Fiber Reinforced Plastics (CFRP) using carbon fiber as a reinforcing fiber) is expensive, which causes an increase in the cost of automobile members. Fifth, as described above, since a thermosetting resin is used as a matrix resin, the curing time is long and the tact time is long. Therefore, it is not suitable for manufacturing an automobile member requiring a short tact time. Sixth, since FRP using a thermosetting resin as a matrix resin does not plastically deform, it cannot be bent once cured.

In order to solve these problems, recently, a metallic member/FRP composite material in which a metallic member and FRP are laminated and integrated (composite formation) has been studied. Regarding the first problem as described above, in the case of a metallic member/FRP composite material, a metallic member such as a steel material can be positioned on the surface of the composite material, so that a coating line or a mold provided for a metal material such as a steel material can be used as it is. Regarding the second problem as described above, the compressive strength of a composite material can be increased by forming a composite of the FRP with a metallic member having high compressive strength. Regarding the third problem as described above, by forming a composite with a metallic member such as a steel material having ductility, the brittleness of the composite material is reduced and the composite material can be deformed. Regarding the fourth problem as described above, by forming a composite of a low-priced metallic member and FRP, the amount of FRP used can be reduced, so that the cost of automobile members can be reduced.

In order to form a composite of a metallic member and FRP, it is necessary to bond or adhere the metallic member and the FRP. As a bonding method, a method using an epoxy resin-based thermosetting adhesive is generally known.

In addition, in order to solve the problems when using the above FRP for automobile members, recently, use of a thermoplastic resin as a matrix resin of the FRP instead of a thermosetting resin such as an epoxy resin has been studied. Regarding the third problem as described above, since a thermoplastic resin is used as the matrix resin, the FRP can be plastically deformed, and the brittleness can be reduced. Regarding the fifth problem as described above, solidification and softening become easy by using a thermoplastic resin as the matrix resin, so that the tact time can be shortened. Regarding the sixth problem as described above, since the FRP can be plastically deformed as described above, the bending process also becomes easy.

As described above, the above-described problems in the case where the FRP is used as an automobile member can be solved by forming a composite of the metallic member and the FRP using a thermoplastic resin as a matrix resin.

Here, regarding the bonding or adhering means between the fiber-reinforced resin material such as FRP and the metallic member, technical development has been actively carried out mainly from the viewpoint of strengthening the bonding force between the metallic member and the bonding or adhering means.

For example, in Patent Document 1 and Patent Document 2, there has been proposed a technique for improving the bonding strength between a metallic member and a CFRP, wherein a bonding surface of the metallic member is subjected to surface roughening treatment and then a hard and highly crystalline thermoplastic resin is injection-molded thereon, or an adhesive layer of an epoxy resin is provided on the metallic member.

In Patent Document 3, a composite of a reinforcing fiber base material and a metal has been proposed, wherein a bonding surface of a carbon fiber base material with a metallic member is impregnated with an adhesive resin such as epoxy-based adhesive resin and the other surface is impregnated with a thermoplastic resin to form a prepreg.

Patent Document 4 proposes a method of manufacturing a sandwich structure using a CFRP molded material using a polyurethane resin matrix with a steel plate. The material of this document utilizes a good moldability of a thermoplastic polyurethane resin and pursues a high strength by forming a thermoset resin by causing a crosslinking reaction of the polyurethane resin by after-cure.

Patent Document 5 discloses that a prepreg is prepared by applying a powder of a phenoxy resin or a resin composition obtained by mixing a crystalline epoxy resin and an acid anhydride as a crosslinking agent to a phenoxy resin onto a reinforcing fiber base material by a powder coating method, and CFRP is prepared by mold curing the prepreg by a hot press.

Patent Document 6 proposes a method of manufacturing a structural component for a vehicle body wherein a composite material composed of a flat carrier material made of a metal and a fiber-reinforced thermoplastic material and a support material made of a thermoplastic material is heated to form a rib structure in the support material, and the carrier material is formed into a three-dimensional component.

Patent Document 7 proposes a fiber-reinforced resin intermediate material which is used by being heated and pressed in a laminated state, in which a reinforcing fiber base material has voids open at its outer surface, and a resin in a powder form is in a semi-impregnated state.

PRIOR ART LITERATURE

Patent Document

Patent Document 1: International Publication No. 2009/116484
Patent Document 2: Japanese Patent Publication (kokai) No. 2011-240620
Patent Document 3: Japanese Patent Publication (kokai) No. 2016-3257
Patent Document 4: Japanese Patent Publication (kokai) No. 2015-212085
Patent Document 5: International Publication No. 2016/152856
Patent Document 6: Japanese Patent Publication (kohyo) No. 2015-536850
Patent Document 7: Japanese Patent No. 5999721

Non-Patent Document

Non-Patent Document 1: Takeyuki Tanaka, Journal of the Society of Color Materials, Vol. 63, No. 10, pp. 622-632, 1990

SUMMARY OF THE INVENTION

Problems to be Solved by the Invention

However, even with the technologies proposed in Patent Documents 1 to 7 as described above, the shear strength between a fiber-reinforced resin material such as FRP and a metallic member is not sufficient.

Therefore, the present invention has been made in view of the above problems, and it is an object of the present invention to provide a metal-fiber reinforced resin material composite which is lightweight and excellent in workability while improving a shear strength between the metallic member and the fiber-reinforced material by more strongly bonding the metallic member and the fiber-reinforced resin material.

Means for Solving the Problem

The present inventors have conducted intensive studies, and as a result, it has been found that by making a fiber-reinforced resin material composed of a matrix resin containing a specific thermoplastic resin and a reinforcing fiber material contained in the matrix resin, and interposing a resin layer made of the same type of resin as the matrix resin between the reinforcing fiber material and the metallic member, a shear strength between the metallic member and the fiber-reinforced resin material can be improved, and thus, the present invention has been completed.

That is, according to an aspect of the present invention, there is provided a method for producing a metal-fiber-reinforced resin material composite, comprising a metallic member and a fiber-reinforced resin material laminated on at least one surface of the metallic member, comprising preparing said fiber-reinforced resin material having a reinforcing fiber base material made of a reinforcing fiber material, a matrix resin in a first cured state impregnated in the reinforcing fiber base material and containing a thermoplastic resin, and a resin layer in a first cured state interposed between the metallic member and the reinforcing fiber material and made of the same type of resin as said matrix resin, and formed by leaching the matrix resin impregnated in the reinforcing fiber base material to the surface of the metallic member, and changing a glass transition temperature of the matrix resin and the resin constituting the resin layer by heating so that a shear strength between the metallic member and the fiber-reinforced resin material after heating is 0.8 MPa or more, wherein before and after the matrix resin and the resin constituting the resin layer are changed from the first cured state to the second cured state.

As described above, by leaching the matrix resin impregnated into the reinforcing fiber base material to the surface of the metallic member, a resin layer made of the same resin as the matrix resin can be formed between the metallic member and the reinforcing-fiber material. Further, the glass transition temperature of the matrix resin and the resin constituting the resin layer is changed before and after the matrix resin and the resin constituting the resin layer are changed from the first cured state to the second cured state by heating. As a result, the heated metallic member and the fiber-reinforced resin material can be more firmly bonded. Therefore, the shear strength between the heated metallic member and the fiber-reinforced resin material can be 0.8 MPa or more. Here, the shear strength is measured by a "shear test" described later. Therefore, 0.8 MPa is equivalent to 40 N/5 mm.

Here, the matrix resin in the first cured state may contain, as the thermoplastic resin, one or more selected from the group consisting of a phenoxy resin (A), a polyolefin and an acid-modified product thereof, a polycarbonate, a polyamide, a polyester, a polystyrene, vinyl chloride, an acrylic and further super engineering plastics such as a polyetheretherketone and a polyphenylene sulfide.

In the method for producing a metal-fiber-reinforced resin material composite, the matrix resin in the first cured state may contain 50 parts by mass or more of the phenoxy resin (A) with respect to 100 parts by mass of the resin component.

In the method for producing a metal-fiber reinforced resin material composite, the matrix resin in the first cured state is a crosslinkable resin composition further containing a crosslinkable curable resin (B) in a range of 5 parts by mass or more and 85 parts by mass or less with respect to 100 parts by mass of the phenoxy resin (A), wherein the first cured state is a solidified product of the matrix resin and the resin constituting the resin layer, and the second cured state may be a crosslinked cured product of the matrix resin and the resin constituting the resin layer.

In the method for producing a metal-fiber reinforced resin material composite, the resin layer in the first cured state is a layer having a content of 5% by mass or less of a fiber detached from the reinforcing fiber material. This layer has a thickness of 20 μm or less.

According to another aspect of the present invention, there is provided a metal-fiber reinforced resin material composite comprising a metallic member and a fiber-reinforced resin material laminated on at least one surface of the metallic member and formed into a composite with the metallic member, wherein the fiber-reinforced resin material has a matrix resin containing a thermoplastic resin, a reinforcing fiber material contained in the matrix resin, a resin layer interposed between the reinforcing fiber material and the metallic member, and made of the same type of resin as the matrix resin, wherein a shear strength between the metallic member and the fiber-reinforced resin material is 0.8 MPa or more.

As described above, the fiber-reinforced resin material is composed of a matrix resin containing a thermoplastic resin, and a reinforcing fiber material contained in the matrix resin, and the metallic member and the fiber-reinforced resin material can be more firmly bonded by interposing a resin layer between the reinforcing fiber material and the metallic member, the resin layer made of the same type of resin as the matrix resin. Therefore, a shear strength between the metallic member and the fiber-reinforced resin material can be 0.8 MPa or more.

Here, the maximum load of the metal-fiber reinforced resin material composite may exceed a law of mixture, and thus may exhibit a super-law-of-mixture (or law of overmixture).

Further, the matrix resin in the first cured state may contain, as the thermoplastic resin, one or more selected from the group consisting of a phenoxy resin (A), a polyolefin and an acid-modified product thereof, a polycarbonate, a polyamide, a polyester, a polystyrene, vinyl chloride, an acrylic, and super engineering plastics such as a polyetheretherketone and a polyphenylene sulfide.

In the metal-fiber-reinforced resin material composite, the matrix resin preferably contains 50 parts by mass or more of the phenoxy resin (A) with respect to 100 parts by mass of the resin component.

In the metal-fiber-reinforced resin material composite, the resin constituting the resin layer preferably consists of a crosslinked cured product, and the crosslinked cured product preferably has a glass transition temperature of 160° C. or higher.

In the metal-fiber-reinforced resin material composite, the resin layer is a layer in which the content of fibers detached from the reinforcing fiber material is 5% by mass or less, and the thickness of the layer is preferably 20 μm or less.

In the metal-fiber-reinforced resin material composite, the total thickness T1 of the metallic member and the elastic modulus E1 of the metallic member, the total thickness T2 of the fiber-reinforced resin material and the elastic modulus E2 of the fiber reinforced resin material may satisfy the relationship of the following Formula (1).

$$T1 \times E1 > 0.3 \times T2 \times E2 \qquad \text{Formula (1)}$$

$$(T1 \times E1)/(T2 \times E2) > 0.3 \qquad \text{Formula (1)}$$

In the metal-fiber-reinforced resin material composite, a material of the metallic member may be a steel material, an iron-based alloy, titanium, or aluminum.

The steel material may be a hot-dip galvanized steel sheet, an electro-galvanized steel sheet, or an aluminum-plated steel sheet.

According to another aspect of the present invention, there is provided a metal-fiber reinforced resin material comprising a metallic member; and a fiber reinforced resin material laminated on at least one surface of the metallic member and being formed into a composite with the metallic member, wherein the fiber-reinforced resin material has a matrix resin containing a thermoplastic resin, a reinforcing fiber material contained in the matrix resin, and a resin layer interposed between the reinforcing fiber material and the metallic member, and made of the same type of resin as the matrix resin wherein the matrix resin is a crosslinked cured product of a cross-linkable resin composition comprising 50 parts by mass or more of the phenoxy resin (A) with respect to the resin component, and 5 parts by mass or more and 85 parts by mass or less of a crosslinkable resin composition (B) with respect to 100 parts by mass of the phenoxy resin (A).

As described above, a matrix resin containing a thermoplastic resin, and a reinforcing fiber material contained in the matrix resin constitute a fiber-reinforced resin material, and a resin layer are interposed between the reinforcing fiber material and the metallic member and made of the same type of resin as the matrix resin, and further a phenoxy resin (A) and a crosslinkable curable resin (B) at a predetermined ratio are contained as a matrix resin. As a result, the metallic member and the fiber-reinforced resin material can be bonded more firmly. Therefore, a shear strength between the metallic member and the fiber-reinforced resin material can be greatly improved.

Here, the maximum load of the metal-fiber-reinforced resin material composite may show a super-law-of-mixture.

In the metal-fiber-reinforced resin material composite, a shear strength between the metallic member and the fiber-reinforced resin material is preferably 0.8 MPa or more.

In the metal-fiber-reinforced resin material composite, it is possible that before and after the matrix resin and the resin constituting the resin layer change from a solidified product in a first cured state to a crosslinked cured product in a second cured state by heating, the glass transition temperature changes so that a shear strength between the metallic member and the fiber-reinforced resin material after heating may become 0.8 MPa or more.

In the metal-fiber-reinforced resin material composite, the resin layer is a layer in which the content of fibers detached from the reinforcing fiber material is 5% by mass or less, and the thickness of the layer is preferably 20 μm or less.

In the metal-fiber-reinforced resin material composite, the total thickness T1 of the metallic member and the elastic modulus E1 of the metallic member, the total thickness T2 of the fiber-reinforced resin material, and the elastic modulus E2 of the fiber-reinforced resin material satisfy the relationship of the following Formula (1), $$(T1 \times E1)/(T2 \times E2) > 0.3 \qquad \text{Formula (1).}$$

In the metal-fiber-reinforced resin material composite, a material of the metallic member may be a steel material, an iron-based alloy, titanium, or aluminum.

The steel material may be a hot-dip galvanized steel sheet, an electro-galvanized steel sheet, or an aluminum-plated steel sheet.

The Effect of the Invention

As described above, according to the present invention, it is possible to provide a metal-fiber reinforced resin material composite which is lightweight and excellent in workability and a method for producing the same, since the metallic member and the fiber-reinforced resin material can be more firmly bonded, and thus a shear strength between the metallic member and the fiber-reinforced material can be improved.

EMBODIMENTS FOR CARRYING OUT THE INVENTION

Figure 1:
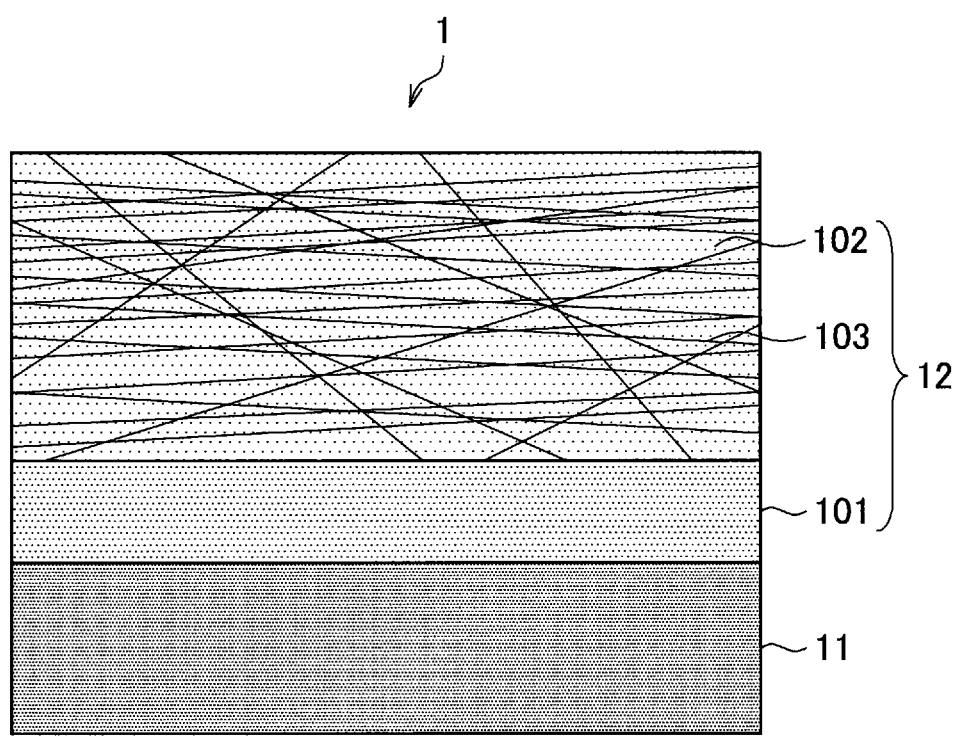
FIG. 1 is a schematic view showing a cross-sectional structure of a metal-fiber-reinforced resin material composite according to a preferred embodiment of the present invention.

Hereinafter, preferred embodiments of the present invention will be described in detail with reference to the accompanying drawings. In the specification and the drawings, components having substantially the same functional configuration are denoted by the same reference numerals to avoid redundant description.

[Configuration of Metal-Fiber-Reinforced Resin Material Composite]

Figure 2:
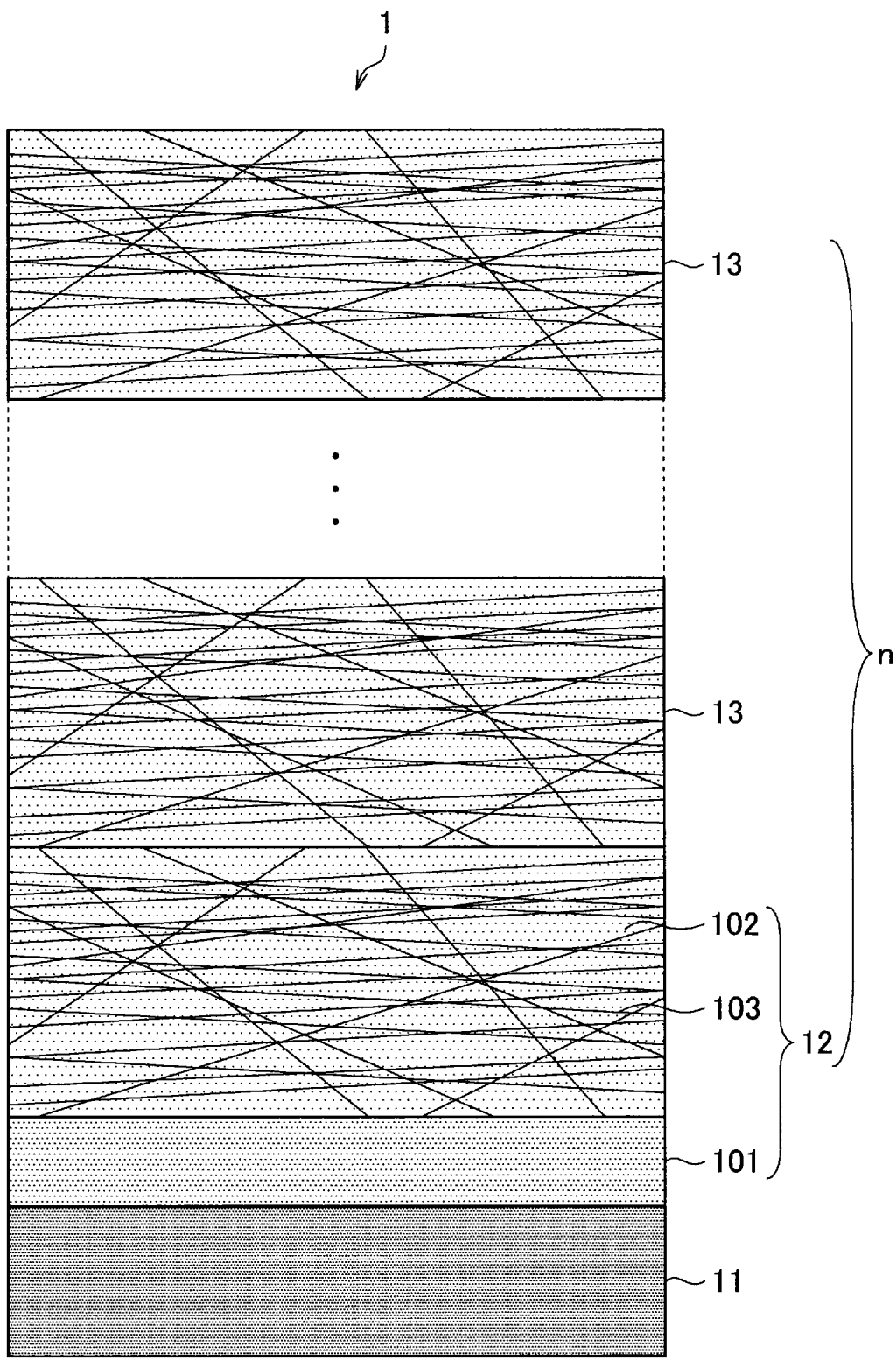
FIG. 2 is a schematic view showing a cross-sectional structure of another aspect of a metal-fiber-reinforced resin material composite according to the same embodiment.

First, the configuration of the metal-fiber-reinforced resin material composite according to the preferred embodiment of the present invention will be described with reference to FIG. 1 and FIG. 2. FIG. 1 and FIG. 2 are schematic view showing a cross-sectional structure in the stacking direction of a metal-FRP composite 1 as an example of a metal-fiber-reinforced resin material composite according to the present embodiment.

As shown in FIG. 1, the metal-FRP composite 1 includes a metallic member 11 and an FRP layer 12 as an example of a fiber-reinforced resin material according to the present embodiment. The metallic member 11 and the FRP layer 12 are formed into a composite via a resin layer 101, which is a part of the FRP layer 12. Here, "formed into composite (composite formation)" means that the metallic member 11 and the FRP layer 12 (fiber-reinforced resin material) are bonded (attached) via the resin layer 101 to be integrated. Also, "integrated" means that the metallic member 11 and the FRP layer 12 (fiber-reinforced resin material) move as a single unit when being processed or deformed.

In the metal-FRP composite 1, the FRP layer 12 constitutes a part or all of the fiber-reinforced resin material of the present embodiment. Further, the resin layer 101, which is a part of the FRP layer 12 is interposed between the reinforcing fiber material 103 and the metallic member 11, as described later and it is made of the same type of the resin of the matrix 102 of the FRP layer.

In the present embodiment, the resin layer 101 is provided so as to be in contact with at least one surface of the metallic member 11, and firmly bonds the metallic member 11 and the FRP layer 12. However, the resin layer 101 and the FRP layer 12 may be provided not only on one side of the metallic member 11 but also on both sides. Further, a laminate including the resin layer 101 and the FRP layer 12 may be disposed between the two metallic members 11.

Hereinafter, each component of the metal-FRP composite 1 and other configurations will be described in detail.

(Metallic Member 11)

The material, shape and thickness of the metallic member 11 are not particularly limited as long as they can be formed by pressing or the like, but the shape is preferably a thin plate. Examples of the material for the metallic member 11 include, for example, iron, titanium, aluminum, magnesium and alloys thereof. Here, examples of the alloy include, for example, an iron-based alloy (including stainless steel), a Ti-based alloy, an Al-based alloy, and a Mg alloy. The material for the metallic member 11 is preferably a steel material, an iron-based alloy, titanium and aluminum, and more preferably a steel material having a higher elastic modulus than other metal types. Examples of such a steel material include steel materials such as cold rolled steel sheets for general use, drawing or ultra deep drawing specified by Japanese Industrial Standards (JIS) as thin sheet steel sheets used for automobiles; workable cold-rolled high-tensile steel sheet for automobiles; hot-rolled steel sheet for general and working use; hot-rolled steel sheet for automobile structure; workable hot-rolled high-tensile steel sheet for automobiles. Examples of such a steel material further includes carbon steel, alloy steel, high-tensile steel and the like used for general structural and mechanical structure purposes as steel materials which are not limited to thin plates.

Any surface treatment may be applied to the steel material. Here, the surface treatment includes, for example, various plating treatments such as galvanizing (hot-dip galvanized steel sheet, electrogalvanizing, etc.) and aluminum plating, chemical conversion treatments such as chromate treatment and non-chromate treatment, and physical surface roughening treatment such as sand blasting or chemical surface roughening treatment such as chemical etching, but is not limited thereto. Further, alloying of plating and plural kinds of surface treatments may be performed. As the surface treatment, at least a treatment for the purpose of imparting rust resistance is preferably performed.

In order to enhance the adhesiveness to the FRP layer 12, it is preferable to treat the surface of the metallic member 11 with a primer. As a primer used in this treatment, for example, a silane coupling agent or a triazinethiol derivative is preferable. Examples of the silane coupling agent include an epoxy silane coupling agent, an amino silane coupling agent, and an imidazole silane compound. Examples of triazine thiol derivatives include 6-diallylamino-2,4-dithiol-1,3,5-triazine, 6-methoxy-2,4-dithiol-1,3,5-triazine monosodium, 6-propyl-2,4-dithiolamino-1,3,5-triazine monosodium and 2,4,6-trithiol-1,3,5-triazine.

Here, depending on the material of the metallic member 11, an oil film may be formed on the surface of the metallic member 11 from the viewpoint of rust prevention or the like. For example, when the metallic member 11 is a hot-dip galvanized steel plate, an electro-galvanized steel plate, or an aluminum-plated steel plate among other steel materials, an oil film made of rust-preventive oil is often formed on the surface of the metallic member 11. It is sometimes difficult to bond the FRP and the metallic member 11 with a sufficient bonding strength, when an attempt is made to bond the FRP and the metallic member 11 with the resin layer 101 while such an oil film is formed on the surface of the metallic member 11. That is, it may be difficult to produce the metal-FRP composite 1 exhibiting the super-law-of-mixture. Therefore, when an oil film is formed on the surface of the metallic member 11, it is preferable to perform a degreasing treatment before bonding with the FRP. As a result, the FRP and the metallic member 11 can be bonded with a sufficient bonding strength, and the metal-FRP composite 1 can easily obtain a strength exceeding the law of mixture described later. Incidentally, regarding the necessity of degreasing, the intended metallic member 11 is bonded and integrated with the intended FRP with the intended adhesive resin composition without a degreasing step in advance to confirm and judge as to whether or not a super-law-of-mixture is actually achieved. The law of mixture and super-law-of-mixture will be described later.

(FRP Layer 12)

The FRP layer 12 has a matrix resin 102, and a reinforcing fiber material 103 contained in the matrix resin 102 to be formed into a composite, and a resin layer 101 located between the reinforcing fiber material 103 and the metallic member 11. The resin layer 101 may be provided on at least one side of the FRP layer 12, or may be provided on both sides. That is, when the metallic members 11 are arranged on both sides of the FRP layer 12, the resin layers 101 are provided between the metallic members 11 and both sides of the reinforcing fiber material 103.

The FRP layer 12 may be laminated with at least one or more other FRP layers 13 to constitute a fiber-reinforced resin material, for example, as shown in FIG. 2. In this case, the FRP layer 13 may be a single layer or two or more layers. When the FRP layers 13 are laminated, at least the FRP layers 12 that are in contact with the metallic members 11 may have the resin layers 101. The other FRP layer 13 may have the same configuration as the FRP layer 12, or may have a different configuration. The thickness of the FRP layers 12 and 13 and the total number n of the FRP layers 12 and 13 when one or more FRP layers 13 are arranged may be appropriately set according to the purpose of use. When the FRP layers 13 are arranged, the FRP layers 12 and 13 may have the same or different configurations. That is, the types of the resin constituting the matrix resin 102 of the FRP layer 12 and the matrix resin of the FRP layer 13 and the type and content ratio of the reinforcing fiber material 103 may be different for each layer. From the viewpoint of ensuring the adhesion between the FRP layer 12 and the FRP layer 13, it is preferable to select the same as or the same type of resin or the similar ratio of polar groups contained in a polymer for the FRP layer 12 and one or more FRP layers 13. Here, "the same resins" mean that they include the same components and have the same composition ratios. "the same type of resins" mean that if their main components are the same, their composition ratios may be different. "The same type of resins" include "the same resin". Further, the "main component" means a component contained in an amount of 50 parts by mass or more based on 100 parts by mass of all resin components. The "resin component" includes a thermoplastic resin and a thermosetting resin, but does not include a non-resin component such as a crosslinking agent.

Hereinafter, the reinforcing fiber material 103, the matrix resin 102 and the resin layer 101 in the FRP layer 12 are described in order.

<Reinforcing Fiber Material 103>

The reinforcing fiber material 103 is not particularly limited, but is preferably, for example, carbon fiber, boron fiber, silicon carbide fiber, glass fiber, aramid fiber, or the like, and more preferably carbon fiber. For the type of carbon fiber, for example, any of PAN-based and pitch-based ones can be used, and may be selected according to the purpose can be used. Further, as the reinforcing fiber material 103, one kind of the above-described fiber may be used alone, or a plurality of kinds may be used in combination. Incidentally, as the reinforcing fiber material in the FRP layer, the same type of material as described above can be used.

<Matrix Resin 102>

The matrix resin 102 is made of a resin composition containing a thermoplastic resin.

Resin Composition

The resin composition constituting the matrix resin 102 may contain a thermosetting resin as a resin component in addition to the thermoplastic resin, but preferably contains the thermoplastic resin as a main component. The kind of the thermoplastic resin that can be used for the matrix resin 102 is not particularly limited. For example, one or more selected from phenoxy resin, polyolefin and its acid-modified product, polystyrene, polymethyl methacrylate, AS resin, ABS resin, polyester such as polyethylene terephthalate and polybutylene terephthalate, vinyl chloride, acrylic, polycarbonate, polyamide, super engineering plastics such as polyether sulfone, polyphenylene ether and modified products thereof, polyimide, polyamideimide, polyether imide, polyetheretherketone, polyphenylene sulfide, polyoxymethylene, polyarylate, polyetherketone, polyetherketoneketone, nylon and the like can be used. The "thermoplastic resin" also includes a resin that can be a crosslinked cured product in a second cured state described later. In addition, as the thermosetting resin that can be used for the matrix resin 102, for example, one or more selected from an epoxy resin, a vinyl ester resin, a phenol resin and a urethane resin can be used.

Here, in the metal-FRP composite 1, a resin composition containing a thermoplastic resin (preferably containing a thermoplastic resin as a main component) is used as the matrix resin 102. As described above, when the matrix resin 102 contains a thermoplastic resin, the above-described problems when a thermosetting resin is used as the matrix resin of the FRP, that is, the problems such that the FRP layer 12 has brittleness, and the tact time is long and it cannot be bent can be solved.

Here, although the details will be described later, in the process of forming the matrix resin 102 of the FRP layer 12, the matrix resin 102 may leach out to the surface of the metallic member 11 (in other words, the interface between the metallic member 11 and the reinforcing fiber material 103). Then, the resin layer 101 may be formed by the matrix resin 102 that has been leached on the surface of the metallic member 11. When the resin layer 101 is formed by leaching the matrix resin 102, the thermoplastic resin constituting the matrix resin 102 is preferably one or more selected from the group consisting of phenoxy resin, polyolefin and its acid-modified product, polycarbonate, polyamide, polyester, polystyrene, vinyl chloride, acrylic, and further super-engineering plastics such as polyetheretherketone and polyphenylenesulfide. When these thermoplastic resins are melted by heating, the molecules flow at a viscosity corresponding to the temperature and the molecular weight at heating and melting, and the molecules can sufficiently flow through the fiber bundles in the FRP under conditions of appropriate flow. Therefore, in the process of forming the matrix resin 102, they can leach out onto the surface of the metallic member 11. In addition, when the thermoplastic resin flowing at an appropriate viscosity comes into contact with the surface of the metal material, and when the metal material surface and the thermoplastic resin molecules have a suitable interaction, a good adhesive force can be obtained. In addition, since the flow into the unevenness of the metal material surface is improved, it is possible to obtain a more suitable adhesion state such that the anchor effect is easily obtained. The conditions (temperature at heating and molecular weight) at which the viscosity is appropriate differ for each resin, but when the super-law-of-mixture described later is satisfied, it can be determined that the viscosity is appropriate.

However, usually, the thermoplastic resin has a high viscosity when melted, and cannot be impregnated into the reinforcing fiber material 103 in a low viscosity state unlike a thermosetting resin such as an epoxy resin before thermosetting. Therefore, impregnating property to the reinforcing fiber material 103 is poor. As a result, unlike the case where a thermosetting resin is used as the matrix resin 102, the reinforcing fiber density (VF: Volume Fraction) in the FRP layer 12 cannot be increased. Taking carbon fiber reinforced plastic (CFRP) using carbon fibers as the reinforcing fiber material 103 as an example, when an epoxy resin is used as the matrix resin 102, VF can be about 60%. When a thermoplastic resin such as polyethylene or nylon is used as the matrix resin 102, the VF becomes about 50%. Here, in order for the FRP to exhibit an excellent tensile strength, it is necessary that the matrix resin 102 is impregnated into the reinforcing fiber material 103 in a state where each of the fibers constituting the reinforcing fiber material 103 is strongly drawn in the same direction at a high density. It is difficult for the matrix resin 102 to impregnate the reinforcing fiber material 103 in such a state. If the reinforcing fiber material 103 is not sufficiently impregnated with the matrix resin 102 and a defect such as a void occurs in the FRP, not only does the FRP not show a desired tensile strength, but also the FRP may have brittle fracture starting from the defect. Therefore, impregnation property is very important. In addition, when a thermoplastic resin such as polypropylene or nylon is used, the FRP layer 12 cannot have a high heat resistance as when a thermosetting resin such as an epoxy resin is used.

In order to solve the problems when using such a thermoplastic resin, it is preferable to use a phenoxy resin as the matrix resin 102. Since the phenoxy resin has a molecular structure very similar to that of the epoxy resin, the phenoxy resin has the same level of heat resistance as the epoxy resin, and has good adhesiveness to the metallic member 11 and the reinforcing fiber material 103. Furthermore, a so-called partially cured resin can be obtained by adding a curing component such as an epoxy resin to the phenoxy resin and copolymerizing the same. By using such a partially cured resin as the matrix resin 102, it is possible to obtain a matrix resin excellent in impregnation property into the reinforcing fiber material 103. Further, by thermally curing the curing component in the partially cured resin, it is possible to prevent the matrix resin 102 in the FRP layer 12 from melting or softening when exposed to a high temperature unlike in a normal thermoplastic resin. The amount of the curing component added to the phenoxy resin may be appropriately determined in consideration of the impregnating property to the reinforcing fiber material 103, the brittleness of the FRP layer 12, the tact time, the workability, and the like. As described above, by using the phenoxy resin as the matrix resin 102, it becomes possible to add and control the curing component with a high degree of freedom.

For example, when carbon fiber is used as the reinforcing fiber material 103, the surface of the carbon fiber is often provided with a sizing agent that has an affinity to an epoxy resin. Since the structure of the phenoxy resin is very similar to that of the epoxy resin, a sizing agent for the epoxy resin can be used as it is by using the phenoxy resin as the matrix resin 102. Therefore, a cost competitiveness can be improved.

Further, among the thermoplastic resins, the phenoxy resin has a good moldability, is excellent in the adhesiveness to the reinforcing fiber material 103 and the metallic member 11. In addition, by using an acid anhydride, an isocyanate compound, caprolactam or the like as a crosslinking agent, the similar properties to those of the thermosetting resin having high heat resistance after molding can be provided. Therefore, in the present embodiment, as the resin component of the matrix resin 102, it is preferred that a solidified product or cured product of the resin composition in which the phenoxy resin (A) is contained in an amount of 50 parts by mass or more based on 100 parts by mass of the resin component (that is, in 100 parts by mass of the resin component, 50 parts by mass or more are composed of the phenoxy resin (A)) is preferably used. Here, when simply referred to as "solidified product", it means that the resin component itself has been solidified (first cured state), and when referred to as "cured product", it means that the resin component contains various curing agents, and is cured (second cured state). The curing agent that can be contained in the cured product also includes a crosslinking agent as described below. The above-described "cured product" includes a crosslinked cured product formed by crosslinking. By using such a resin composition, the metallic member 11 and the FRP layer 12 can be firmly bonded. The resin composition preferably contains 55 parts by mass or more of the phenoxy resin (A) based on 100 parts by mass of the resin component. The form of the adhesive resin composition may be, for example, a powder, a liquid such as a varnish, or a solid such as a film.

The content of the phenoxy resin (A) can be measured using infrared spectroscopy (IR), as described below. When the content ratio of the phenoxy resin is analyzed from the resin composition targeted by IR, it can be measured according to the method disclosed in Non-patent Document 1. Specifically, it can be measured by using a general method of IR analysis such as a transmission method and an ATR reflection method.

The FRP layer 12 is cut out with a sharp knife or the like, the fibers are removed as much as possible with tweezers or the like, and the resin composition to be analyzed is sampled from the FRP layer 12. In the case of the transmission method, a KBr powder and a powder of the resin composition to be analyzed are crushed while being uniformly mixed in a mortar or the like to form a thin film, which is used as a sample. In the case of the ATR reflection method, a tablet as a sample may be prepared by crushing the powder while uniformly mixing it in a mortar, similarly to the transmission method, or a surface of a single-crystal KBr tablet (for example, 2 mm in diameter×1.8 mm thickness) may be scratched with a file or the like, and the resin composition to be analyzed is dusted and adhered to make a sample. In any method, it is important to measure the background of KBr alone before mixing with the resin to be analyzed. As the IR measuring device, a commercially available general measuring device can be used, but an apparatus having the absorbance in accuracy of 1% unit, and the wavenumber in analysis accuracy of 1 cm$^{-1}$ unit is preferable, and examples thereof include FT/IR-6300 manufactured by JASCO Corporation.

When investigating the content of the phenoxy resin (A), the absorption peaks of the phenoxy resin are as shown in FIGS. 2, 3, 4, 6, and 7 of the above-described Non-Patent Document 1. When only those absorption peaks disclosed in the above-described Non-Patent Document 1 are observed in the measured IR spectrum, it is determined that the composition is composed of only the phenoxy resin.

Figure 3:
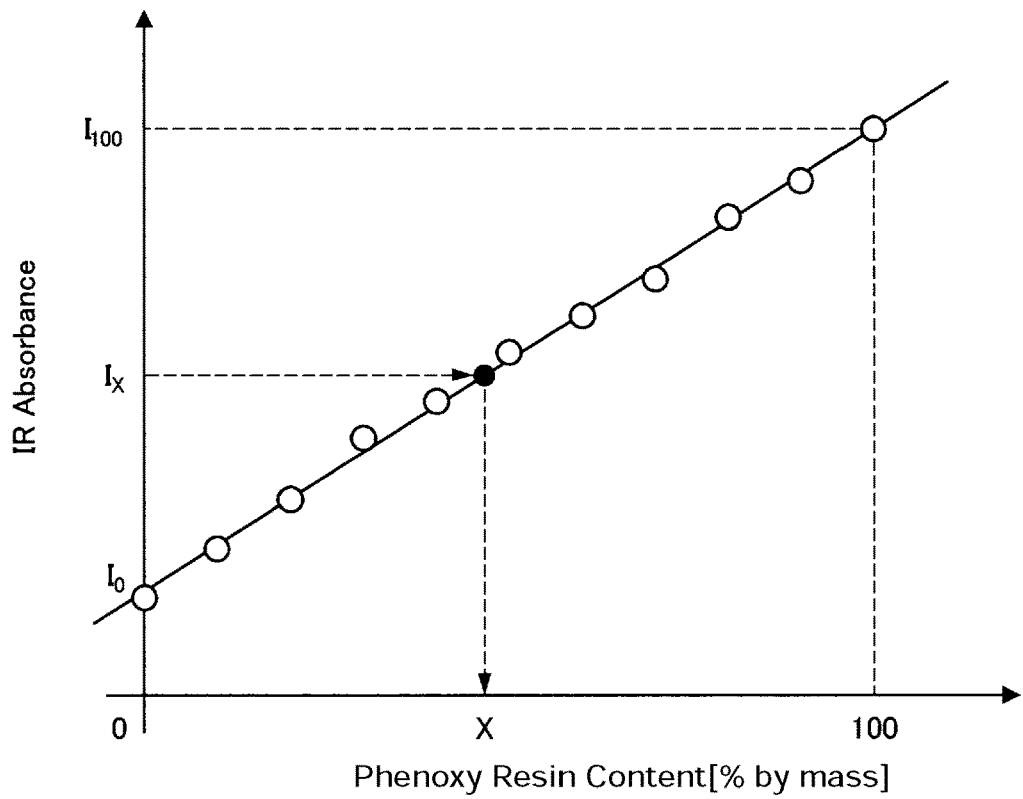
FIG. 3 is an explanatory diagram for describing a method for measuring the content of a phenoxy resin.

On the other hand, when a peak other than the absorption peaks disclosed in the above-described Non-Patent Document 1 is detected, it is determined that the resin composition contains another resin composition, and the content thereof is estimated as follows. The mixing ratios of the powder of the resin composition to be analyzed and the powder of the phenoxy resin composition (for example, Phenotote YP-50S manufactured by Nippon Steel & Sumikin Chemical Co., Ltd.) in a mass ratio of 100:0, 90:10, 80:20, 70:30, 60:40, 50:50, 40:60, 30:70, 20:80, 10:90 and 0:100 are used to analyzed by IR analysis, and the change in the intensity of the peak (eg, 1450-1480 cm$^{-1}$, near 1500 cm$^{-1}$, near 1600 cm$^{-1}$, etc.) is recorded. Based on the obtained change in intensity, a calibration curve is created as shown in FIG. 3. By using the obtained calibration curve, the phenoxy resin content of a sample whose phenoxy resin content is unknown can be determined.

Specifically, if the phenoxy content of the resin composition to be analyzed is X %, X % can be estimated from the change in strength when the content of the phenoxy resin is varied from X % to 100%. That is, when measured at the above mixing ratio, the content of the phenoxy resin varies from X, 0.9X+10, 0.8X+20, 0.7X+30 ... 0.2X+80, 0.1X+90 to 100%. A graph having a horizontal axis representing the content and a vertical axis representing the absorbance peak intensity is made by plotting points, and a straight line connecting each point can be drawn on the graph. Here, if the intensity at the content of 100% is $I_{100}$, the intensity at the content of X % is $I_X$, and the intensity at the content of 0%, that is, Y intercept of the graph is $I_0$, then $(I_X - I_0)/(I_{100} - I_0) \times 100 = X$ %. Accordingly, X can be determined. The reason why the mixing ratios are finely distributed at intervals of 10% is to improve the measurement accuracy.

"Phenoxy resin" is a linear polymer obtained from a condensation reaction between a dihydric phenol compound and epihalohydrin or a polyaddition reaction between a dihydric phenol compound and a bifunctional epoxy resin, and is an amorphous thermoplastic resin. The phenoxy resin (A) can be obtained by a conventionally known method in a solution or without solvent, and can be used in any form of powder, varnish, and film. The average molecular weight of the phenoxy resin (A) is, for example, in the range of 10,000 or more and 200,000 or less as a weight average molecular weight (Mw), and preferably in the range of 20,000 or more and 100,000 or less, more preferably in the range of 30,000 or more and 80,000 or less. By setting the Mw of the phenoxy resin (A) to be in the range of 10,000 or more, the strength of the molded article can be increased. This effect is further enhanced by setting the Mw to 20,000 or more, and further to 30,000 or more. On the other hand, by setting the Mw of the phenoxy resin (A) to 200,000 or less, excellent usability and workability can be obtained. This effect is further enhanced by setting the Mw to 100,000 or less, and further to 80,000 or less. Mw in the present specification is a value measured by gel permeation chromatography (GPC) and converted using a standard polystyrene calibration curve.

The hydroxyl equivalent (g/eq) of the phenoxy resin (A) used in the present embodiment is, for example, in the range of 50 or more and 1,000 or less, preferably in the range of 50 or more and 750 or less, and more preferably in the range of 50 or more and 500 or less. By setting the hydroxyl group equivalent of the phenoxy resin (A) to 50 or more, the number of hydroxyl groups decreases and the water absorption decreases, so that the mechanical properties of the cured product can be improved. On the other hand, by setting the hydroxyl equivalent of the phenoxy resin (A) to 1000 or less, it is possible to suppress a decrease in the number of hydroxyl groups, thereby improving the affinity with the adherend and improving the mechanical properties of the metal-FRP composite 1. This effect is further enhanced by setting the hydroxyl equivalent to 750 or less, or further 500 or less.

The glass transition temperature (Tg) of the phenoxy resin (A) is, for example, preferably in the range of 65° C. or higher and 150° C. or lower, and more preferably in the range of 70° C. or higher and 150° C. or lower. If the Tg is 65° C. or higher, the flowability of the resin can be suppressed from being too large while ensuring the moldability, so that the thickness of the resin layer 101 can be sufficiently ensured. On the other hand, if the Tg is 150° C. or lower, the melt viscosity becomes low, so that it becomes easy to impregnate the reinforcing fiber base material without defects such as voids, and a lower temperature bonding process can be performed. The Tg of the phenoxy resin (A) in the present specification is a numerical value calculated from a peak value in the second scanning, which is measured using a differential scanning calorimeter at a temperature rise of 10° C./min at a temperature within the range of 20 to 280° C.

The phenoxy resin (A) is not particularly limited as long as it satisfies the above-mentioned physical properties, but is preferably a bisphenol A-type phenoxy resin (for example, available as Phenotote YP-50, Phenotote YP-50S, and Phenotote YP-55U manufactured by Nippon Steel & Sumikin Chemical Co., Ltd.), bisphenol F type phenoxy resin (for example, available as Phenotote FX-316 manufactured by Nippon Steel & Sumikin Chemical Co., Ltd.), phenoxy resin derived from copolymerization of bisphenol A and bisphenol F (e.g., available as YP-70 manufactured by Nippon Steel & Sumikin Chemical Co., Ltd.), and special phenoxy resins such as brominated phenoxy resins, phosphorus-containing phenoxy resins, and sulfone group-containing phenoxy resins other than the phenoxy resins listed above (for example, available as phenothote PB-43C, Phenotote FX293 and YPS-007, etc. manufactured by Nippon Steel & Sumikin Chemical Co., Ltd.) and the like. These resins can be used alone or in a mixture of two or more.

The resin composition used as the resin component of the matrix resin 102 preferably has a melt viscosity of 3,000 Pa·s or less in any temperature range of 160 to 250° C., preferably has a melt viscosity in the range of 90 Pa·s or more and 2,900 Pa·s or less, more preferably has a melt viscosity in the range of 100 Pa·s or more and 2,800 Pa·s or less. By setting the melt viscosity in the temperature range of 160 to 250° C. to 3,000 Pa·s or less, the fluidity at the time of melting is improved, and defects such as voids are less likely to occur in the resin layer 101. On the other hand, if the melt viscosity is 90 Pa·s or less, the molecular weight of the resin composition is too small, and if the molecular weight is too small, the resin composition becomes brittle and the mechanical strength of the metal-FRP composite 1 decreases.

Crosslinkable Resin Composition

A crosslinkable resin composition (that is, a cured product of the resin composition) can also be prepared by blending, for example, an acid anhydride, isocyanate, caprolactam, or the like as a crosslinking agent into the resin composition containing the phenoxy resin (A). Since the heat resistance of the resin composition is improved by performing a crosslinking reaction using a secondary hydroxyl group contained in the phenoxy resin (A), the crosslinkable resin composition is advantageous for use in the member used in a higher temperature environment. For crosslinking formation using a secondary hydroxyl group of the phenoxy resin (A), it is preferable to use a crosslinkable resin composition in which a crosslinkable curable resin (B) and a crosslinking agent (C) are blended. As the crosslinkable curable resin (B), for example, an epoxy resin or the like can be used, but it is not particularly limited. By using such a crosslinkable resin composition, a cured product in a second cured state (crosslinked cured product) is obtained in which the Tg of the resin composition is greatly improved as compared with the case of using the phenoxy resin (A) alone. The Tg of the crosslinked cured product of the crosslinkable resin composition is, for example, 160° C. or higher, preferably 170° C. or higher and 220° C. or lower.

In the crosslinkable resin composition, as the crosslinkable curable resin (B) mixed with the phenoxy resin (A), an epoxy resin having two or more functionalities is preferable. Bifunctional or higher functional epoxy resins include bisphenol A type epoxy resins (for example, available as Epototo YD-011, Epototo YD-7011 and Epototo YD-900 manufactured by Nippon Steel & Sumikin Chemical Co., Ltd.), bisphenol F type epoxy resins (for example, available as Epototo YDF-2001 manufactured by Nippon Steel & Sumikin Chemical Co., Ltd.,), diphenyl ether type epoxy resin (for example, available as YSLV-80DE manufactured by Nippon Steel & Sumikin Chemical Co., Ltd.), tetramethylbisphenol F type epoxy resin (for example, YSLV-80XY manufactured by Nippon Steel & Sumikin Chemical Co., Ltd.), bisphenol sulfide type epoxy resin (for example, available as YSLV-120TE manufactured by Nippon Steel & Sumikin Chemical Co., Ltd.), hydroquinone type epoxy resin (for example, available as Epototo YDC-1312 manufactured by Nippon Steel & Sumikin Chemical Co., Ltd.), phenol novolak type epoxy resin (for example, available as Epototo YDPN-638 manufactured by Nippon Steel & Sumikin Chemical Co., Ltd.,), ortho-cresol novolak type epoxy resin (for example, available as Epototo YDCN-701, Epototo YDCN-702, Epototo YDCN-703 and Epototo YDCN-704 manufactured by Nippon Steel & Sumikin Chemical Co., Ltd.), aralkyl naphthalene diol novolak type epoxy resin (for example, available as ESN-355 manufactured by Nippon Steel & Sumikin Chemical Co., Ltd.), and a triphenylmethane type epoxy resin (for example, available as EPPN-502H manufactured by Nippon Kayaku Co., Ltd.), but are not limited thereto. These epoxy resins may be used alone or in a mixture of two or more.

The crosslinkable curable resin (B) is not particularly limited, but is preferably a crystalline epoxy resin, and more preferably, a crystalline epoxy resin having a melting point in the range of 70° C. or higher and 145° C. and lower, and a melt viscosity at 150° C. of 2.0 Pa·s or less. By using a crystalline epoxy resin having such melting properties, the melt viscosity of the crosslinkable resin composition as the resin composition can be reduced, and the adhesiveness of the resin layer 101 can be improved. If the melt viscosity exceeds 2.0 Pa·s, the moldability of the crosslinkable resin composition may decrease, and the homogeneity of the metal-FRP composite 1 may decrease.

Examples of the crystalline epoxy resin suitable as the crosslinkable curable resin (B) include, for example, Epototo YSLV-80XY, YSLV-70XY, YSLV-120TE, YSLV-120TE and YDC-1312 manufactured by Nippon Steel & Sumikin Chemical Co., Ltd., and YX-4000, YX-4000H, YX-8800, YL-6121H and YL-6640, etc. manufactured by Mitsubishi Chemical Corporation, HP-4032, HP-4032D and HP-4700, etc., manufactured by DIC Corporation, and NC-3000, etc. manufactured by Nippon Kayaku Co., Ltd.

The crosslinking agent (C) crosslinks the phenoxy resin (A) three-dimensionally by forming an ester bond with the secondary hydroxyl group of the phenoxy resin (A). Therefore, unlike strong crosslinking such as curing of a thermosetting resin, the crosslinking can be released by a hydrolysis reaction, so that the metallic member 11 and the FRP layer 12 can be easily separated. Accordingly, each of the metallic member 11 and the FRP layer 12 can be recycled.

As the crosslinking agent (C), an acid anhydride is preferable. The acid anhydride is not particularly limited as long as it is solid at an ordinary temperature and does not have much sublimability. However, from the viewpoint of imparting heat resistance to the metal-FRP composite 1 and reactivity, aromatic acid anhydrides having two or more acid anhydrides which react with the hydroxyl group of the phenoxy resin (A) are preferred. In particular, aromatic compounds having two acid anhydride groups, such as pyromellitic anhydride, are preferably used because the crosslink density becomes higher and the heat resistance is improved as compared with the combination of trimellitic anhydride and hydroxyl groups. Among aromatic acid dianhydrides, aromatic acid anhydrides compatible with a phenoxy resin or an epoxy resin, for example, 4,4'-oxydiphthalic acid, ethylene glycol bisanhydrotrimellitate, and 4,4'-(4,4'-isopropylidene diphenoxy) diphthalic anhydride are more preferable because they have an effect of improving Tg. In particular, an aromatic acid dianhydride having two acid anhydride groups such as pyromellitic anhydride is preferably used because it enhances crosslinking density and enhances heat resistance as compared to phthalic anhydride having only one acid anhydride group. That is, an aromatic acid dianhydride has good reactivity because it has two acid anhydride groups, a cross-linked cured product having sufficient strength for demolding can be obtained in a short molding time, and the final crosslink density can be increased, because four carboxyl groups are formed by an esterification reaction with the secondary hydroxyl group in the phenoxy resin (A).

The reaction of the phenoxy resin (A), the epoxy resin as the crosslinkable curable resin (B) and the crosslinking agent (C) is based on an esterification reaction between the secondary hydroxyl group in the phenoxy resin (A) and the acid anhydride group of the crosslinking agent (C), and a reaction between carboxyl group formed by the above esterification reaction and the epoxy group of the epoxy resin, and as a result, crosslinking and curing of the resin occurs. Although a crosslinked phenoxy resin can be obtained by the reaction between the phenoxy resin (A) and the crosslinking agent (C), the melt viscosity of the resin composition can be reduced by the coexistence of the epoxy resin. As a result, excellent properties such as improved impregnation with the adherend (the metallic member 11 and the FRP layer 12), acceleration of the crosslinking reaction, improvement of the crosslink density, and improvement of the mechanical strength can be achieved.

In the crosslinkable resin composition, although an epoxy resin as a crosslinkable curable resin (B) coexists, a phenoxy resin (A) which is a thermoplastic resin is a main component and it is considered that the esterification reaction between the secondary hydroxyl group of the phenoxy resin (A) and the acid anhydride group of the crosslinking agent (C) preferentially occurs. That is, the reaction between the acid anhydride used as the crosslinking agent (C) and the epoxy resin used as the crosslinkable curable resin (B) takes longer time (its reaction speed is slower). Accordingly, the reaction between the crosslinking agent (C) and the secondary hydroxyl group of the phenoxy resin (A) occurs first, and then the crosslinking agent (C) remained in the previous reaction or the residual carboxyl group derived from the crosslinking agent (C) reacts with the epoxy resin to further enhance the crosslink density. Therefore, unlike a resin composition containing an epoxy resin which is a thermosetting resin as a main component, a crosslinked cured product obtained by using a crosslinkable resin composition is a thermoplastic resin and has excellent storage stability.

In the crosslinkable resin composition utilizing the crosslinking of the phenoxy resin (A), it is preferable that the crosslinkable curable resin (B) is contained in the range of 5 parts by mass or more and 85 parts by mass or less with respect to 100 parts by mass of the phenoxy resin (A). The content of the crosslinkable curable resin (B) relative to 100 parts by mass of the phenoxy resin (A) is more preferably in the range of 9 parts by mass or more and 83 parts by mass or less, and still more preferably 10 parts by mass or more and 80 parts by mass or less. By setting the content of the crosslinkable curable resin (B) to 85 parts by mass or less, the curing time of the crosslinkable curable resin (B) can be shortened, so that the strength required for demolding can be easily obtained in a short time, and the recyclability of the FRP layer 12 is improved. This effect is further enhanced by setting the content of the crosslinkable curable resin (B) to 83 parts by mass or less, and more preferably 80 parts by mass or less. On the other hand, when the content of the crosslinkable curable resin (B) is 5 parts by mass or more, the effect of improving the crosslink density due to the addition of the crosslinkable curable resin (B) is easily obtained, and the crosslinked product of the crosslinkable resin composition easily develops Tg of 160° C. or higher, and the fluidity is improved. Incidentally, the content of the crosslinkable curable resin (B) is measured in the same manner for the peak derived from the epoxy resin by the method using IR as described above.

The mixing amount of the crosslinking agent (C) is usually in the range of 0.6 mol or more and 1.3 mol or less of the acid anhydride group per 1 mol of the secondary hydroxyl group of the phenoxy resin (A), preferably is in the range of 0.7 mol or more and 1.3 mol or less, more preferably in the range of 1.1 mol or more and 1.3 mol or less. When the amount of the acid anhydride group is 0.6 mol or more, the crosslink density will be high, resulting in excellent mechanical properties and heat resistance. This effect is further enhanced by setting the amount of the acid anhydride group to 0.7 mol or more, and further to 1.1 mol or more. When the amount of the acid anhydride group is 1.3 mol or less, it is possible to suppress unreacted acid anhydride and carboxyl group from adversely affecting the curing characteristics and the crosslink density. Therefore, it is preferable to adjust the mixing amount of the crosslinkable curable resin (B) depending on the mixing amount of the crosslinker (C). Specifically, for example, a carboxyl group formed by a reaction between a secondary hydroxyl group of the phenoxy resin (A) and an acid anhydride group of the crosslinking agent (C) is reacted with an epoxy resin used as the crosslinkable curable resin (B). For this purpose, the mixing amount of the epoxy resin is preferably in the range of 0.5 mol or more and 1.2 mol or less in equivalent ratio with the crosslinking agent (C). Preferably, the equivalent ratio between the crosslinking agent (C) and the epoxy resin is in the range of 0.7 mol or more and 1.0 mol or less.

When the crosslinking agent (C) is blended with the phenoxy resin (A) and the crosslinkable curable resin (B), a crosslinkable adhesive resin composition can be obtained. An accelerator (D) as a catalyst may be further added to ensure that the cross-linking reaction proceeds. The accelerator (D) is not particularly limited as long as it is a solid at ordinary temperature and has no sublimability. For example, it includes a tertiary amine such as triethylenediamine, imidazoles such as 2-methylimidazole, 2-phenylimidazole and 2-phenyl-4-methylimidazole; organic phosphines such as triphenylphosphine; and tetraphenylboron salts such as tetraphenylphosphonium tetraphenylborate. One type of these accelerators (D) may be used alone, or two or more types may be used in combination. When the crosslinkable resin composition is made into fine powder and adhered to the reinforcing fiber base material using a powder coating method under an electrostatic field to form the matrix resin 102, it is preferable to use, as an accelerator (D), an imidazole-based latent catalyst which is solid at room temperature, and whose catalyst activity temperature is 130° C. or higher. When the accelerator (D) is used, it is preferable that the mixing amount of the accelerator (D) is in the range of 0.1 parts by mass or more and 5 parts by mass or more with respect to 100 parts by mass of the total amount of the phenoxy resin (A), the crosslinkable curable resin (B) and the crosslinking agent (C).

The crosslinkable resin composition is solid at an ordinary temperature, and its melt viscosity is as follows. The minimum melt viscosity, i.e. the lower limit of the melt viscosity in the temperature range of 160 to 250° C. is preferably not more than 3,000 Pa·s, more preferably 2,900 Pa·s or less, and still more preferably 2,800 Pa·s or less. By setting the minimum melt viscosity in the temperature range of 160 to 250° C. to 3,000 Pa·s or less, the crosslinkable resin composition can be sufficiently impregnated into the adherend at the time of heat compression by hot press or the like. Since the occurrence of defects such as voids in the resin layer 101 can be suppressed, the mechanical properties of the metal-FRP composite 1 are improved. This effect is further enhanced by setting the minimum melt viscosity in the temperature range of 160 to 250° C. to 2,900 Pa·s or less, and further 2,800 Pa·s or less.

The resin compositions (including crosslinkable resin compositions) for forming the matrix resin 102 comprise for example, natural rubbers, synthetic rubbers, elastomers, various inorganic fillers, solvents, extender pigments, colorants, antioxidants, UV inhibitors, flame retardants, flame retardant auxiliaries and other additives, as long as they do not impair the adhesiveness or physical properties.

As described above, an oil film may be formed on the surface of the metallic member 11. It may be difficult to bond the FRP and the metallic member 11 with a sufficient bonding strength when an attempt is made to bond the FRP and the metallic member 11 while such an oil film is formed on the surface of the metallic member 11. As one of measures against such a problem, there is a method of degreasing the surface of the metallic member 11 as described above.

On the other hand, when the resin layer 101 is formed by leaching of the matrix resin 102, an oil-surface bonding adhesive may be added to the resin composition for forming the matrix resin 102. At least a part of the oil-surface bonding adhesive added to the resin composition leach out onto the surface of the metallic member 11 and is contained in the resin layer 101. The resin layer 101 including the oil-surface bonding adhesive is firmly bonded to the metallic member 11 even when an oil film is formed on the surface of the metallic member 11.

Here, the oil-surface bonding adhesive is an adhesive that exhibits adhesiveness to an adherend on which an oil film is formed. The oil-surface bonding adhesive is also referred to as an oil-absorbing adhesive or the like, and contains a component having a high affinity for an oil component. That is, when the oil-surface bonding adhesive is applied to the adherend, the oil-surface bonding adhesive closely adheres to the adherend while absorbing oil on the surface of the adherend. Various types of oil-surface bonding adhesives are commercially available, and in the present embodiment, they can be used without any particular limitation. That is, when the metallic member 11 on which the oil film is formed and the FRP to which an oil-surface bonding adhesive is added are bonded, the metal-FRP composite 1 showing the super-law-of-mixture may be produced. In this case, this adhesive is said to be an oil-surface bonding adhesive suitable for the present embodiment. Examples of the oil-surface bonding adhesive include Alphatech 370 (epoxy-based oil-surface bonding adhesive) manufactured by Alpha Kogyo Co., Ltd. and Devcon PW1 (methacrylate-based oil-surface bonding adhesive) manufactured by Devcon Corporation. One type of oil-surface bonding adhesive may be used alone, or a mixture of a plurality of types of oil-surface bonding adhesives may be used.

The mixing amount of the oil-surface bonding adhesive in the matrix resin 102 may be adjusted so that the metal-FRP composite 1 shows a super-law-of-mixture. As an example, it can be 50 parts by mass with respect to 100 parts by mass of the resin component, which is rather large. Or it can be about several parts by mass as long as the effect of the present embodiment (super-law-of-mixture or the like) is exhibited.

When the fiber-reinforced resin material is a laminate in which one or two or more FRP layers 13 are laminated on the FRP layer 12, the matrix resin in the FRP layer 13 is not particularly limited. The resin may be a thermoplastic resin or a thermosetting resin. As the thermoplastic resin, for example, one or more selected from phenoxy resin, polyolefin and acid-modified product thereof, polystyrene, polymethyl methacrylate, AS resin, ABS resin, thermoplastic aromatic polyester such as polyethylene terephthalate and polybutylene terephthalate, vinyl chloride, acrylic, polycarbonate, super engineering plastics such as polyimide, polyamide, polyamideimide, polyether imide, polyether sulfone, polyphenylene ether and modified product thereof, polyetheretherketone, polyphenylene sulfide, polyoxymethylene, polyarylate, polyether ketone, polyetherketoneketone, and nylon and the like can be used. As the thermosetting resin, for example, an epoxy resin, a vinyl ester resin or the like can be used. When a phenoxy resin is used as the matrix resin 102 of the FRP layer 12, it is preferable to form the matrix resin of the FRP layer 13 with a resin composition having good adhesiveness with the phenoxy resin. Here, the resin showing good adhesiveness with the phenoxy resin includes, for example, epoxy resin, phenoxy resin, polyolefin resin acid-modified with maleic anhydride, etc., polycarbonate, polyarylate, polyimide, polyamide, polyether sulfone and the like. However, the matrix resin in the FRP layer 13 is preferably a resin composition containing a thermoplastic resin, as in the FRP layer 12, and is more preferably a resin composition the same type as or the same as the resin composition of the matrix resin 102 in the FRP layer 12.

<Resin Layer 101>

The resin layer 101 is interposed between the metallic member 11 and the FRP layer 12 of the metal-FRP composite 1, and bonds the metallic member 11 and the FRP layer 12. This resin layer 101 is formed between the surface of the metallic member 11 and the reinforcing fiber material 103 closest to the surface. More specifically, when the metallic member 11 and the FRP layer 12 are bonded by heat pressing, the reinforcing fiber material 103 is such that the matrix resin 102 impregnated into the sheet-like reinforcing fiber base material 104 made of the reinforcing fiber material 103 melts. The reinforcing fiber material 103 that has flowed out together with the molten matrix resin 102 forms fine irregularities due to the reinforcing fiber material 103 on the surface of the reinforcing fiber base material 104. The resin layer 101 is formed between the metallic member 11 and the portion of the reinforcing fiber material 103 which is closest to the surface of the metallic member 11 and located on the surface of the reinforcing fiber base material 104 having the fine irregularities. Further, when the matrix resin 102 melts as described above, some of the fibers constituting the reinforcing fiber material 103 may be detached and mixed into the resin layer 101. In other words, the possibility that the fluffy fibers from the reinforcing fiber material 103 are mixed into the resin layer 101 cannot be excluded. However, the amount of fibers mixed in the resin layer 101 is at most 5% by mass or less based on the entire mass of the resin layer 101, and is not enough to reinforce the resin constituting the resin layer 101. That is, the resin layer 101 does not include fibers from the viewpoint of reinforcing the resin. Specifically, the resin layer 101 is a layer in which the content of fibers detached from the reinforcing fiber material 103 is 5% by mass or less, and is preferably made of only a resin composition containing a thermoplastic resin and containing no fiber. Therefore, the resin layer 101 is a portion where the reinforcing action by the fiber is not exerted, and the mechanical strength such as the bending strength and the bending elastic modulus of the resin layer 101 is the same as the mechanical strength inherent to the solidified or cured product of the resin.

Moreover, the resin layer 101 needs to be formed of a resin composition composed of the same type of resin as the matrix resin 102 of the FRP layer 12, and is preferably formed of a resin composition composed of the same resin. The matrix resin of the FRP layer 12 and the resin layer 101 are formed of a resin composition made of at least the same type of resin, so that the adhesion between the metallic member 11 and the FRP layer 12 via the resin layer 101 is strong. As a result, the mechanical strength of the entire metal-FRP composite 1 can be increased. Note that the type, physical properties, and the like of the resin constituting the resin layer 101 are the same as those of the matrix resin 102 described above, and a detailed description thereof will be omitted. As described above, the resin layer 101 may have an oil-surface bonding adhesive.

As will be described later, the resin layer 101 may be formed from a resin that has leached out to an interface with the metallic member 11 in the process of forming the matrix resin 102 of the FRP layer 12, or it may be formed by disposing a resin sheet or applying a resin composition between the precursor of the FRP layer 12 and the metallic member 11. In this case, an oil-surface bonding adhesive may be added to the resin sheet or the coating liquid. The mixing amount of the oil-surface bonding adhesive may be determined by the same method as described above.

Note that an oil-surface bonding adhesive may be applied to the interface between the resin layer 101 and the metallic member 11, and these may be bonded. For example, when the resin layer 101 is formed by leaching of the matrix resin 102, an oil-surface bonding adhesive may be applied to at least one surface of the FRP (or prepreg) and the metallic member 11, and these may be bonded. The application method is not particularly limited, and examples thereof include roll coating, bar coating, spraying, dipping, and application using a brush. When the resin layer 101 is formed form a resin sheet, an oil-surface bonding adhesive may be applied to the surface of the resin sheet on the metallic member 11 side or the surface of the metallic member 11, and these may be adhered. When the resin layer 101 is formed by applying a resin composition, an oil-surface bonding adhesive may be applied to the surface of the metallic member 11 and FRP (or prepreg) on the side where the resin composition is not applied, and these may be bonded. The specific coating amount may be adjusted so that the metal-FRP composite 1 exhibits a super-law-of-mixture. As an example, the coating amount may be 10 to 500 μm thick.

As described above, as a countermeasure when an oil film is formed on the surface of the metallic member 11, a method of performing a degreasing treatment, a method of adding an oil-surface bonding adhesive to a resin composition for forming the matrix resin 102, a method of applying an oil-surface bonding adhesive to the interface between the metallic member 11 and the adhesive resin layer 13 may be used. Any one of these may be performed, or two or more thereof may be used in combination. As described above, when the metallic member 11 is a hot-dip galvanized steel sheet, an electro-galvanized steel sheet, or an aluminum-plated steel sheet, an oil film is often formed on the surface of the metallic member 11. Therefore, when the metallic member 11 is made of such a steel plate, it is preferable to consider taking measures against the oil film, as described above.

Thickness of Resin Layer 101

The resin layer 101 is formed having a substantially uniform thickness between the metallic member 11 and the reinforcing fiber material 103 of the FRP layer 12 and having no void, so that the adhesiveness between the metallic member 11 and the FRP layer 12 can be even stronger. On the other hand, since the resin layer 101 is a layer made of only a resin that is not fiber-reinforced, its mechanical strength is inferior to that of the FRP layer 12 where the reinforcing fiber material 103 of the FRP layer 12 is impregnated into the matrix resin 102. Therefore, if the thickness of the resin layer 101 is too large, the mechanical strength and durability of the metal-FRP composite 1 may be reduced. Further, in order to directly transmit the influence of the strength of the FRP layer 12 having a large mechanical strength such as tensile strength to the metallic member 11, it is preferable that the thickness of the resin layer 101 is somewhat small.

For the above reasons, the thickness of the resin layer 101 is, for example, preferably 50 μm or less, more preferably 40 μm or less, further preferably 20 μm or less, and particularly preferably 10 μm or less. In particular, when the resin layer 101 is derived from the raw resin composition of the matrix resin 102 of the FRP layer 12 (that is, in the process of forming the matrix resin 102, when the raw resin composition is formed from the resin leached out of the raw resin composition of the matrix resin 102 to the interface between the FRP layer and the metallic member 11), the thickness of the resin layer 101 is preferably 20 μm or less, more preferably 10 μm or less. When the thickness of the resin layer 101 exceeds 50 μm, the effect of reinforcing the resin with the fiber becomes lower, and not only the mechanical strength and durability of the metal-FRP composite 1 decreases, but also it becomes difficult to directly transmit the influence of the strength of the FRP layer 12 to the metallic member 11, and thus this is not preferable.

In addition, from the viewpoint of ensuring sufficient adhesion between the metallic member 11 and the FRP layer 12, the thickness of the resin layer 101 is preferably 1 μm or more. When the resin layer 101 is formed by a method such as laminating a resin sheet or applying a raw resin composition, the thickness of the resin layer 101 is preferably 20 μm or more.

(Shear Strength)

In the metal-FRP composite 1 having the above configuration, a shear strength between the metallic member 11 and the fiber-reinforced resin material including the FRP layer 12 (optionally, the FRP layer 13) is preferably 0.8 MPa or more, more preferably more than 1.0 MPa. By making the shear strength to 0.8 MPa or more, sufficient mechanical strength of the metal-FRP composite 1 can be secured, and excellent durability can be obtained. Incidentally, the shear strength in the present embodiment is a value measured by a shear test described later. Therefore, 0.8 MPa is equivalent to 4.0 N/5 mm, and 1.0 MPa is equivalent to 50 N/5 mm.

Note that the shear strength within the above range is such that the matrix resin 102 and the resin composition constituting the resin layer 101 (including the crosslinked resin composition) changes from the first solidified product in the first cured state to the crosslinked cured product in the second cured state by heating, and before and after the change, the glass transition temperature changes. For example, the resin composition in the first cured state has Tg of 150° C. or less, whereas the resin composition in the second cured resin composition has Tg of 160° C. or more. Thereby, the shear strength between the metallic member 11 and the FRP layer 12 after heating can be more reliably changed to 0.8 MPa or more.

(About Super-Law-of-Mixture)

Figure 13:
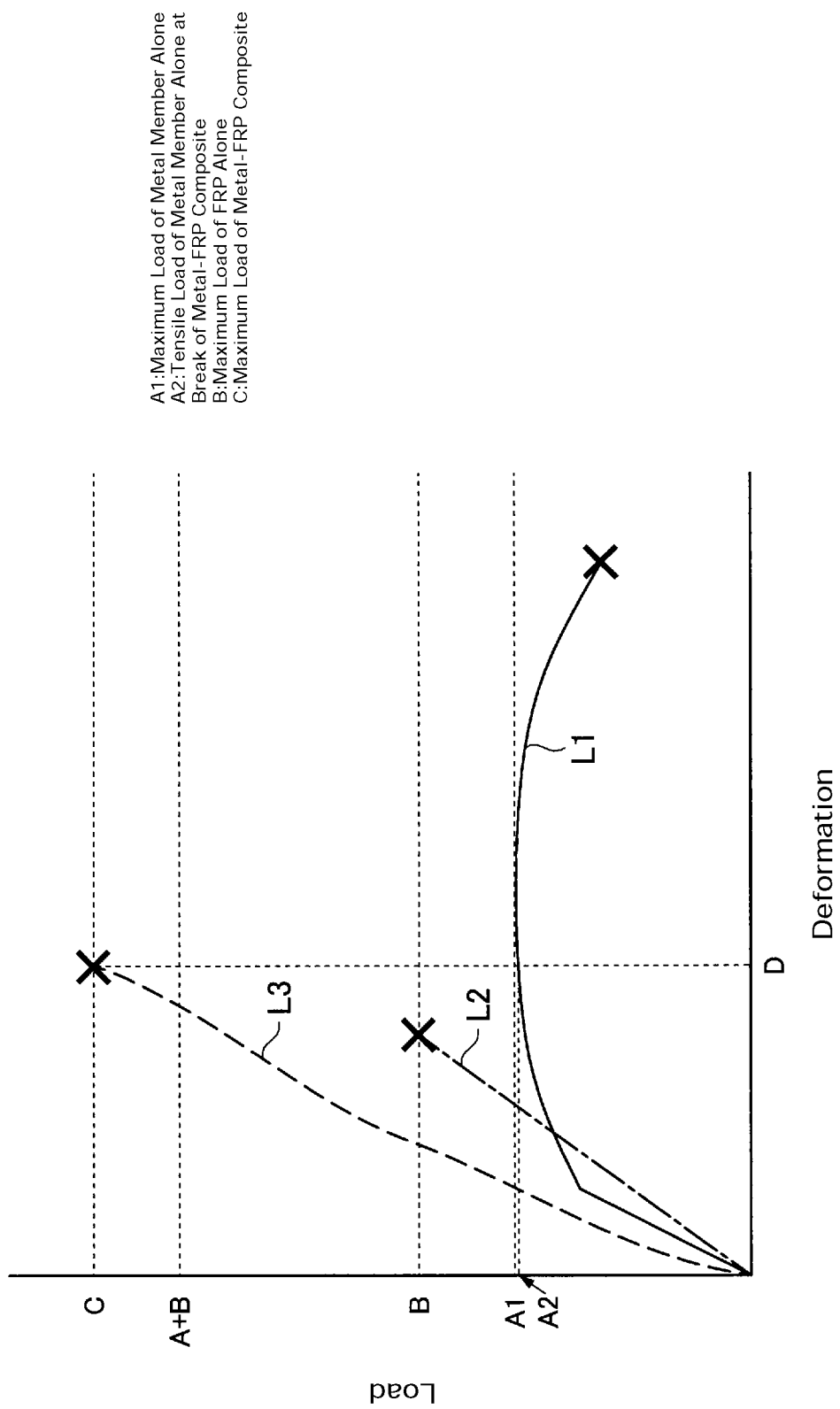
FIG. 13 is a graph schematically showing a result of a tensile test of each test specimen.

The maximum load of the metal-FRP composite 1 according to the present embodiment indicates an excellent strength exceeding law of mixture, that is, super-law-of-mixture. Here, the super-law-of-mixture in the present embodiment will be described with reference to FIG. 13. FIG. 13 is a graph schematically showing the results of measuring the tensile load of the metallic member 11 alone, the tensile load of the FRP alone, and the tensile load of the metal-FRP composite 1. Here, it is assumed that the measurement of the tensile load is performed by a method described in Examples described later. The horizontal axis in FIG. 13 indicates the amount of deformation of the test specimen, and the vertical axis indicates the tensile load. The graph L1 shows the correlation between the deformation amount and the tensile load of the metallic member alone, wherein the load A1 shows the maximum load (the maximum value of the tensile load) of the metallic member 11 alone. The load A2 indicates a tensile load of the metallic member 11 at a deformation amount D described later. The mark x in the graph L1 indicates the deformation amount and the tensile load when the metallic member 11 breaks.

The graph L2 shows the correlation between the amount of deformation and the tensile load of FRP alone, wherein the load B shows the maximum load (the maximum value of the tensile load) of FRP alone. The mark x in the graph L2 indicates that the FRP was broken. The graph L3 shows the correlation between the amount of deformation and the tensile load of the metal-FRP composite 1, wherein the load C shows the maximum load (the maximum value of the tensile load) of the metal-FRP composite 1. The mark x in the graph L3 indicates that the metal-FRP composite 1 breaks, and the deformation D indicates the deformation (elongation) of the metal-FRP composite 1 when the metal-FRP composite 1 breaks.

The super-law-of-mixture in the present embodiment means that Formula (2-2) among Formulae (2-1) and (2-2) described below which are considered as the super-law-of-mixture are satisfied.

$$C > A1 + B \quad (2\text{-}1)$$

$$C > A2 + B \quad (2\text{-}2)$$

That is, the determination of yes or no of the super-law-of-mixture may be made based on whether or not Formula (2-2) is satisfied. Here, since the load A1 is larger than the load A2, if Formula (2-1) is satisfied, Formula (2-2) is necessarily satisfied. Therefore, when Formula (2-1) is satisfied, it is possible to determine that the super-law-of-mixture is satisfied.

Figure 11:
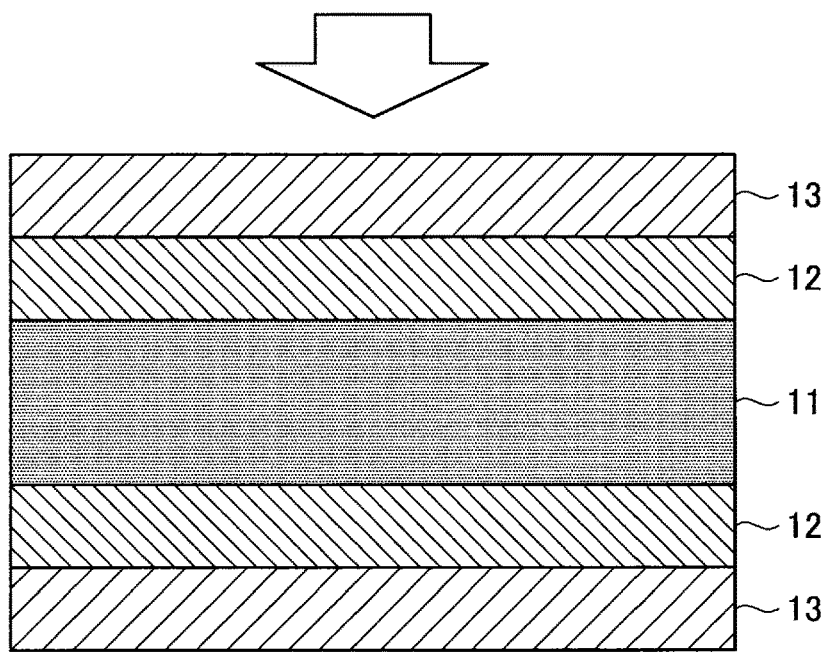
FIG. 11 is an explanatory diagram showing the configuration of a sample metal-fiber-reinforced resin material composite for a bending test in Examples and Comparative Examples.

In the case of a metal of A1>>A2, such as a high tensile steel, Formula (2-2) is satisfied, but Formula (2-1) is often not satisfied. It is possible to judge whether or not the super-law-of-mixture is satisfied based on only Formula (2.2). However, for example, in the case of a metal in which the load A1 and the load A2 are close to each other, such as when soft steel is used (for example, when A1/A2<1.1, (FIG. 11 is an example thereof)), the load A1 may be easier to measure. In this case, it is easier to determine the super-law-of-mixture based on Formula (2-1). At this time, it is determined that the super-law-of-mixture is satisfied if Formula (2-2) is satisfied, even if Formula (2-1) is not satisfied.

If the load C is substantially equal to the total load of the load A1 and the load B, then A1>A2 and thus the super-law-of-mixture is satisfied. As shown in a comparative examples described later, in a metal-FRP composite that does not satisfy the requirements of the present embodiment, the load C may be lower than the total load of the loads A2 and B.

Here, the ratio of the load C to the total load of the load A2 and the load B (=C/(A2+B)) is defined as a degree of the super-law-of-mixture. In this embodiment, a degree of the super-law-of-mixture exceeds 1.00. A degree of the super-law-of-mixture is preferably 1.01 or more, more preferably 1.05 or more. Here, in the determination of the satisfaction of the super-law-of-mixture described above, in the case of a metal such as soft steel in which the load A1 and the load A2 are close to each other, it can be easily determined by using Formula (2-1). However, it is preferable that a degree of the super-law-of-mixture is calculated by C/(A2+B). (About Formula (1)) In order for the metal-FRP composite 1 to exhibit the super-law-of-mixture, it is needed that the metallic member 11 and the FRP layer (when FRP 13 is present, FRP layer 12, 13) have the above-described configuration, for example, and that satisfy the following Formula (1).

$$(T1 \times E1)/(T2 \times E2) > 0.3 \quad \text{Formula (1)}$$

In Formula (1), T1 is the total thickness of the metallic member 11, E1 is the elastic modulus of the metallic member 11, T2 is the total thickness of the FRP layer 12 (that is, the thickness of reinforcing fiber material 103 and the resin layer 101. When the FRP layer 13 is present, the total thickness of the FRP layers 12, 13), and E2 is the elastic modulus of the FRP layer 12 (when the FRP layer 13 is present, the FRP layers 12, 13). The elastic modulus in the present embodiment means a tensile modulus (Young's modulus) at an ordinary temperature (25° C.). Therefore, T1 and E1 are parameters related to the metallic member 11, and T2 and E2 are parameters related to the FRP layer 12 (when the FRP layer 13 is present, the FRP layers 12, 13). T1 is defined as "the total thickness of the metallic member 11" because the metal-FRP composite 1 may be manufactured using a plurality of metallic members 11, such as in the case wherein the FRP layer 12 is sandwiched between a plurality of metallic members 11. The FRP layer 12 is composed of a layer made of a reinforcing fiber material 103 and the matrix resin 102 and a resin layer 101. The elastic modulus E2 of the FRP layer 12 is calculated by adding the elastic coefficients of these layers according to the law-of-mixture. For example, if the layer composed of the reinforcing fiber material 103 and the matrix resin 102 is A, and the resin layer 101 is B, the elastic modulus E2 is (elastic modulus of A×thickness of A/the total thickness T2 of FRP layer 12)+(elastic modulus B×thickness of B/total thickness T2 of FRP layer 12).

Further, the resin layer 101 may be very thin with respect to the thickness of the reinforcing fiber material 103 in some cases. In this case, T2 may be only the thickness of the reinforcing fiber material 103. That is, the thickness of the adhesive resin layer 13 may be ignored. For example, when the thickness of the resin layer 101 is less than 5 μm with respect to the thickness of the reinforcing fiber material 103, the thickness of the resin layer 101 may be ignored. When a plurality of types of metallic members 11 are stacked, E1 is calculated according to the law-of-mixture. For example, when the metallic member 11 is composed of A, B, . . . , E1 is (elastic modulus of A×the total thickness of T1 of a plurality of metallic members)+(elastic modulus of B×the thickness of B)/the total thickness T1 of the metallic member) of the plurality of metallic members. Similarly, when one or more FRP layers 13 are stacked on the FRP layer 12, E2 is calculated according to the law-of-mixture. For example, if the FRP layers 12 and 13 are A, B, C, respectively, E2 is (elastic modulus of A×thickness of A/total thickness T2 of a plurality of FRP layers)+(elastic modulus of B×the thickness of B/total thickness T2 of a plurality of FRP layers). Note that the elastic modulus of the FRP layers 12 and 13 may be the elastic modulus of the reinforcing fiber material 103 constituting these layers.

The maximum load of the metal-FRP composite 1 that satisfies Formula (1) indicates an excellent strength exceeding the law of mixture, i.e., the super-law-of-mixture. The reason is presumed as follows. The metal-FRP composite 1 has a metallic member 11, an FRP layer 12, and a resin layer 101 interposed therebetween. The FRP layer 12 has brittleness, but the metallic member 11 has ductility and a large elastic modulus E1. Here, since the resin layer 101 contains the phenoxy resin (A) having excellent adhesiveness to the metallic member 11, the metallic member 11 and the FRP layer 12 are firmly bonded by the adhesive resin layer 13. Therefore, when a large tensile load is applied to the metal-FRP composite 1, the fracture of the FRP layer 12 (having brittleness) can be suppressed by the action of the metallic member 11 (having ductility and a large elastic modulus E1). Therefore, it is considered that the metal-FRP composite 1 delays brittle fracture and has higher strength when compared with the metallic member 11 alone or the FRP layer 12 alone under the same total thickness conditions.

The metallic member 11 and the resin forming the resin layer 101 have different coefficients of thermal expansion, and the metallic member 11 has a larger amount of change due to heat. Therefore, when the metal-FRP composite 1 is molded at a high temperature and then cooled in the manufacturing process, the FRP layer 12 and the resin layer 101 follow the metallic member 11 having a large expansion and contraction. Therefore, they are fixed under the compressive force (internal stress) to a certain extent from the beginning. When a tensile load is applied to the metal-FRP composite 1, the FRP layer 12 and the resin layer 101 in the compressed state have a larger elongation margin than in the non-compressed state, and their fracture will be delayed by that much. As a result, it is considered that the entire metal-FRP composite 1 can exhibit high tensile strength. Such an effect can be obtained more effectively when the elastic modulus E1 of the metallic member 11 is larger. That is, when the elastic modulus E1 of the metallic member 11 increases, the tensile load per unit elongation of the metal-FRP composite 1 increases. As described above, the elongation margin is increased by the internal stress. Therefore, as the elastic modulus E1 of the metallic member 11 is larger, the tensile load corresponding to this margin (the tensile load required to extend the metal-FRP composite 1 by the above-mentioned margin) increases. Therefore, the metal-FRP composite 1 can withstand higher tensile loads.

Here, Formula (1) as described above is derived by the following experiment.

That is, for many samples in which the thickness and the elastic modulus of the metallic member and the thickness and the elastic modulus of the FRP were changed, whether or not the strength exceeding the law of mixture was obtained was verified by experiments, and the verification results (whether or not the strength exceeding the law of mixture was obtained) by each of samples were plotted on a coordinate plane having a horizontal axis representing the thickness of FRP and vertical axis representing the thickness of the metallic member. Then, a straight line representing the boundary of the region where the strength exceeding the law of mixture is obtained is derived from the results indicated as an approximate curve by a known statistical analysis process. According to Formula (1) as described above, for example, when the elastic modulus E2 of the FRP layer 12 is fixed and if the elastic modulus E1 of the metallic member 11 is high, an excellent strength exceeding the law of mixture can be realized, even if the total thickness T1 of the metallic member 11 is reduced. Conversely, if the elastic modulus E1 of the metallic member 11 is low, the total thickness T1 of the metallic member 11 will be increased in order to realize an excellent strength exceeding the law of mixture.

For the above reasons, as the metal-FRP composite 1 satisfying the above Formula (1), one in which a material of the metallic member 11 is iron (steel material, iron-based alloy, etc.) is preferable. Since iron has a large elastic modulus E1 of about 200 GPa and has toughness, an excellent strength can be maintained even when the thickness T1 is low. In addition, as a material of the metallic member 11, although not as good as iron, titanium (about 105 GPa) and aluminum (about 70 GPa) having a large elastic modulus E1 are preferably used.

The thicknesses of the metallic member 11, the FRP layer 12 and the resin layer 101 can be measured in accordance with the cross-sectional method of the optical method described in JIS K 5600-1-7, 5.4 as follows. That is, using an ordinary temperature curable resin that can be embedded without gaps and without adversely affecting the sample, using a low-viscosity epomount 27-777 manufactured by Refinetech Co., Ltd. as a main component and 27-772 as a curing agent, the sample was embedded. The sample is cut in the direction parallel to its thickness direction to expose its cross-section at a place to be observed by a cutting machine, and an observation surface of the sample is prepared by polishing the exposed surface with polishing paper of a count specified by JIS R #6252 or 6253 (for example, 280 count, 400 count or 600 count). When an abrasive material is used to create the observation surface, it is polished with an appropriate grade of diamond paste or similar paste. In addition, buffing may be performed as necessary to smooth the surface of the sample to a state that can be suited for observation.

Figure 4:
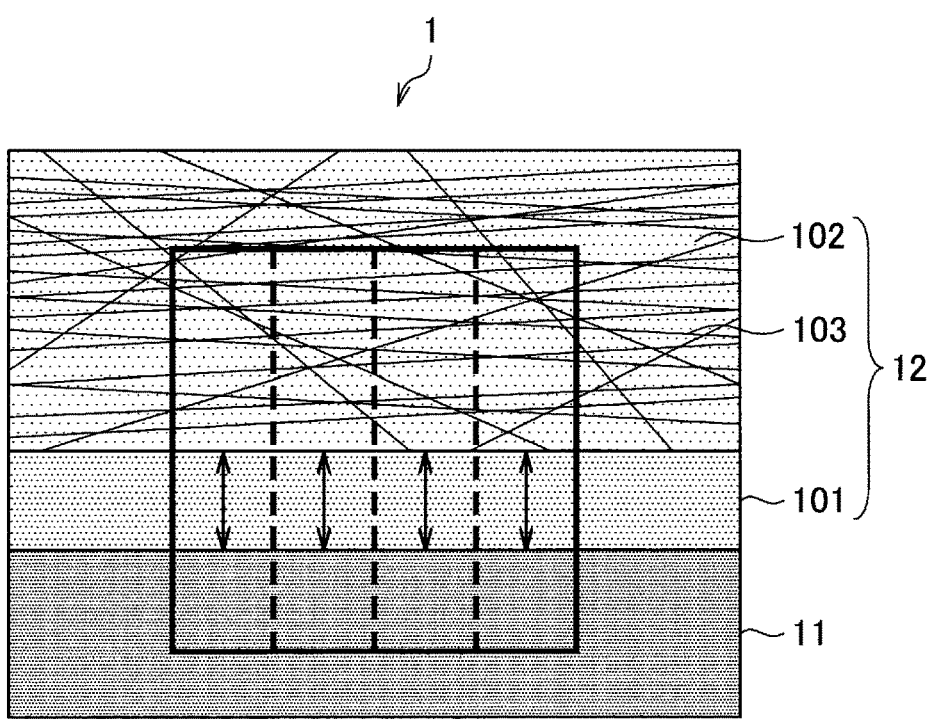
FIG. 4 is an explanatory diagram for describing a method of measuring a thickness.

A microscope equipped with an appropriate illumination system to give an optimal image contrast, and capable of measuring with an accuracy of 1 µm (for example, BX51 manufactured by Olympus Corporation) is used and the size of its visual field is selected to set 300 µm. Here, the size of the visual field may be changed so that the respective thickness can be confirmed (for example, if the thickness of the FRP layer 12 is 1 mm, the size of the visual field may be changed to confirm the thickness). For example, when measuring the thickness of the resin layer 101, the observation visual field is divided into four equal parts as shown in FIG. 4, and the thickness of the resin layer 101 is measured at the center in the width direction of each dividing point. The average thickness is the thickness in the visual field. This observation visual field is measured by selecting five different locations, dividing the observation visual field into four equal parts, measuring the thickness of each part, and calculating the average value of the measurements. For adjacent observation visual fields, they should be selected at a distance of 3 cm or more. The value obtained by further averaging the average values at these five points may be used as the thickness of the resin layer 101. Further, the measurement of the thickness of the metallic member 11 or the FRP layer 12 may be performed in the same manner as the measurement of the thickness of the resin layer 101.

When the boundary surfaces of the metallic member 11, the resin layer 101 and the reinforced fiber material 103 are relatively clear, the thickness of the resin layer 101 can be measured by the above method. However, the boundary between the resin layer 101 and the reinforcing fiber material 103 is not always clear. For example, when the resin layer 101 is formed by leaching of the matrix resin 102, the boundary surface is often not clear. In such a case, the boundary line may be specified by the following method. That is, the metal-FRP composite 1 is scraped off from the metallic member 11 using a grinder or the like to which a diamond grindstone is attached. Then, the cut surface is observed with the above-mentioned microscope, and the area ratio of the fiber portion constituting the reinforcing fiber material 103 (the area ratio of the fiber portion to the total area of the observation visual field) is measured. The area ratio may be measured in a plurality of observation visual fields, and the arithmetic average value thereof may be used as the area ratio of the fiber portion. Then, the cut surface when the area ratio of the fiber portion exceeds 10% may be used as a boundary surface between the resin layer 101 and the reinforcing fiber material 103.

(About Preferable Range of $(T1 \times E1)/(T2 \times E2)$)

Figure 14:
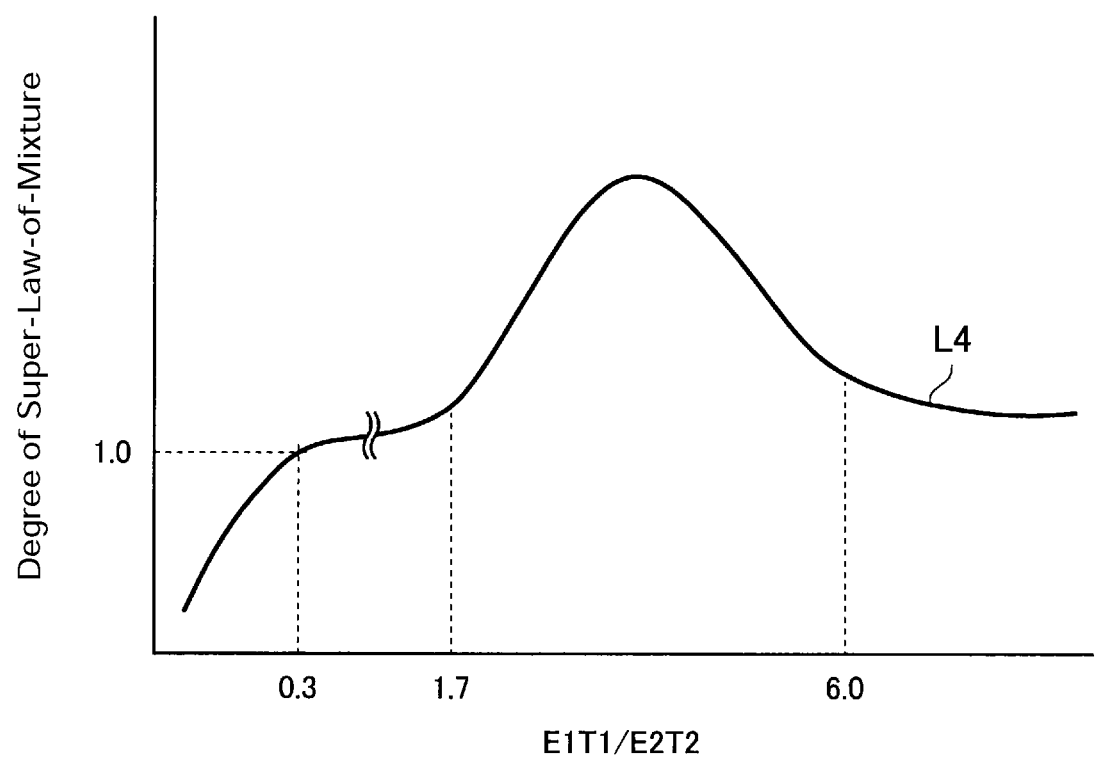
FIG. 14 is a graph schematically showing a preferable range of (T1×E1)/(T2×E2).

As described above, a degree of the super-law-of-mixture is preferably 1.01 or more, and more preferably 1.05 or more. In other words, it can be said that the larger a degree of the super-law-of-mixture, the better. Here, the present inventors examined in detail the results of the below-described examples (examples in which the metal-FRP composite 1 was manufactured under various manufacturing conditions and their characteristics were evaluated), and it became clear that there is a correlation between (T1×E1)/(T2×E2) and a degree of the super-law-of-mixture. Since the manufacturing conditions of each of Examples are various, it is not possible to simply compare degrees of the super-law-of-mixture in each of Examples. Therefore, the present inventors estimated the degree of the super-law-of-mixture when the manufacturing conditions were leveled, and plotted the result on the coordinate plane indicating (T1×E1)/(T2×E2) on the horizontal axis and a degree of the super-law-of-mixture on the vertical axis to obtain graph L4 shown in FIG. 14. According to the graph L4, when (T1×E1)/(T2×E2) is 0.3, a degree of super-law-of-mixture becomes 1.00, and when (T1×E1)/(T2×E2) is larger than 0.3 (that is, when Formula (1) is satisfied), a degree of the super-law-of-mixture exceeds 1.00. Further, when (T1×E1)/(T2×E2) is in the range of 1.7 to 6.0, a degree of the super-law-of-mixture has a local maximum value. Therefore, it is understood that the preferable lower limit of (T1×E1)/(T2×E2) is 1.7 or more, and the preferable upper limit is 6.0 or less. When (T1×E1)/(T2×E2) is a value within this range, a degree of the super-law-of-mixture is a value of 1.01 or more, and further, a value of 1.05 or more. A more preferred lower limit is 2.5 or more, and a more preferred upper limit is 3.0 or less. This is because when (T1×E1)/(T2×E2) is 2.5 or more and 3.0 or less, a degree of the super-law-of-mixture becomes a local maximum value or a value closer to the local maximum value. The local maximum value may be larger than 1.05, for example, about 2.7.

[Method for Producing Metal-Fiber-Reinforced Resin Material Composite]

As described above, the configuration of the metal-FRP composite 1 as the metal-fiber-reinforced resin material composite according to the present embodiment has been described in detail. Next, referring to FIGS. 5 to 9, a method for producing the metal-FRP composite 1 of the present embodiment will be described. FIGS. 5 to 9 are explanatory diagrams showing an example of the manufacturing steps of the metal-FRP composite 1.

The method for manufacturing the metal-FRP composite 1 according to the present embodiment, includes a step (1) for producing the FRP layer 12 and a step (2) for making the shear strength between the metallic member 11 and the FRP layer 12 to 0.8 MPa or more. In the step (1), the FRP layer 12 including the reinforcing fiber base material 104, the matrix resin 102 in the first cured state impregnated in the reinforcing fiber base material 104, and the resin layer 101 in the first cured state is formed. In the step (2), the resin composition constituting the matrix resin 102 and the resin layer 101 is changed from the first cured state to the second cured state by heating. Before and after this change, the glass transition temperature of the resin composition changes, and thus a shear strength between the metallic member 11 and the FRP layer 12 after heating becomes 0.8 MPa or more.

In the above step (1), it is preferable that the resin layer 101 in the first cured state is formed by leaching out the matrix resin 102 impregnated in the reinforcing fiber base material 104 to the surface of the metallic member 11.

In the above step (1), the matrix resin 102 in the first cured state preferably contains 50 parts by mass or more of the phenoxy resin (A) with respect to 100 parts by mass of the resin component.

In the above step (1), the matrix resin 102 in the first cured state is preferably a crosslinkable resin composition containing a crosslinkable curable resin (B) in the range of 5 parts by mass or more and to 85 parts by mass or less with respect to 100 parts by mass of the phenoxy resin (A). In this case, the first cured state is a solidified product of the resin composition for forming the matrix resin 102 and the resin layer 101, and the second cured state is a crosslinked cured product of the resin composition for forming the matrix resin 102 and the resin layer 101.

More specific methods for producing the metal-FRP composite 1 as described above include, for example, the following production methods 1 to 3.

[Production Method 1]

First, the flow of the Production Method 1 will be described with reference to FIGS. 5 to 7. Production Method 1 includes, for example, step A and step B.

<Step A>

Step A is a step of forming a prepreg 106 having a partially fused structure 105A of a raw resin composition containing a thermoplastic resin on at least one surface of the reinforcing fiber base material 104. As a method for performing this step A, for example, there is the following Method A1 or Method A2.

(Method A1)

Method A1 may further include the following steps a and b.

Step a:

In step a, as shown in FIGS. 5(a) and 5(b), a fine powder 105 of a raw material resin composition which is solid at an ordinary temperature is applied to at least one surface of a sheet-like reinforcing fiber base material 104 made of a reinforcing fiber material 103 to form a resin-attached fiber base material 104A. As a method of attaching the fine powder 105 to the reinforcing fiber base material 104, for example, a powder coating method can be used. Here, the above-mentioned oil-surface bonding adhesive may be added to the raw resin composition. According to the powder coating method, since the raw resin composition is fine particles, it is easily melted, and has an appropriate gap in the coated film after application, so that it becomes an escape route for air and is less likely to generate voids. When the prepreg 106 and the metallic member 11 are heat-pressed in the step B described later, the resin melted on the prepreg surface at first quickly wets the surface of the metallic member 11 and spread thereon, and then impregnated into the inside of the reinforcing fiber base material 104. Therefore, as compared with the conventionally used melt impregnation method, defects due to insufficient wettability of the molten resin on to the surface of the metallic member 11 are less likely to occur. That is, in the melt impregnation method in which the reinforcing fiber base material 104 is bonded to the metallic member 11 by the resin extruded from the reinforcing fiber base material 104, the wettability of the molten resin to the surface of the metallic member 11 by the molten resin tends to be insufficient in the prepared prepreg. However, powder coating method solves this problem.

Examples of the powder coating method include, for example, an electrostatic coating method, a fluidized bed method, and a suspension method as main methods. Among these, the electrostatic coating method and the fluidized bed method are suitable methods for a thermoplastic resin. This is preferred because the process is simple and the productivity is good. In particular, the electrostatic coating method is most preferable because the uniformity of the adhesion of the fine powder 105 of the raw resin composition to the reinforcing fiber base material 104 is good.

FIG. 5(b) shows a state in which the fine powder 105 of the raw resin composition adheres to one surface of the resin-attached fiber base material 104A. However, the powder 105 may be attached onto both sides of the resin-attached fiber base material 104A.

(Coating Conditions by Powder Coating Method)

The average particle diameter of the fine powder 105 of the raw material resin composition used in the powder coating method is, for example, preferably in the range of 10 μm or more and 100 μm or less, more preferably in the range of 40 μm or more and 80 μm or less, and still more preferably in the range of 40 μm or more and 50 μm or less. By setting the average particle diameter of the fine powder 105 to 100 μm or less, the energy when the fine powder 105 collides with the fiber in powder coating under an electrostatic field can be reduced, and the adhesion rate to the reinforcing fiber base material 104 can be increased. Further, by setting the average particle diameter to 10 μm or less, it is possible to suppress a decrease in adhesion efficiency by the scattering of particles due to accompanying airflow, and to prevent the working environment from being deteriorated by the fine powder 105 of the raw resin composition floating in the air. As a method for pulverizing the raw material resin composition, use of a pulverizer/mixer such as a low-temperature dry pulverizer (Centry Dry Mill) is preferable, but not limited thereto. Further, when pulverizing the raw material resin composition, a plurality of components as raw materials may be pulverized and then mixed with each other, or pulverized after mixing a plurality of components in advance.

In the powder coating, the amount of the fine powder 105 of the raw material composition adhered to the reinforcing fiber base material 104 (resin ratio: RC) may be preferably, for example, in a range of 20% or more and 50% or less. RC is more preferably in a range of 25% or more and 45% or less, and further preferably in a range of 25% or more and 40% or less. By setting the RC to 50% or less, it is possible to prevent a decrease in mechanical properties such as the tensile and flexural modulus of the FRP. Further, by setting the RC to 20% or more, a necessary amount of the resin adhered can be secured, so that the matrix resin 106 is sufficiently impregnated into the inside of the reinforcing fiber base material, and the thermophysical property and mechanical property can be improved.

(Conditions for Reinforcing Fiber Base Material)

As the reinforcing fiber base material 104 which is a sheet-like base material made of the reinforcing fiber material 103, a nonwoven fabric base material using chopped fibers, a cloth material using continuous fibers, and a unidirectional reinforcing fiber base material (UD material), etc. can be used. From the viewpoint of the reinforcing effect, it is preferable to use a cloth material or a UD material as the reinforcing fiber base material. Further, as for the type of the reinforcing fiber material 103, for example, any of a PAN type and a pitch type may be used, and one of these may be used alone or two or more types may be used in combination depending on the purpose or application.

When a carbon fiber cloth material or a UD material is used as the reinforcing fiber base material 104, a carbon fiber that has been subjected to a fiber opening treatment (referred to as a filament) is preferable. Generally, a carbon fiber is a fiber bundle composed of a large number such as 1,000 to tens of thousands of short fibers, and has a circular or slightly flat elliptical cross section. For this reason, it is difficult to reliably impregnate the resin inside the fiber bundle. The opening treatment is a process in which the carbon fiber bundle is widened in the width direction and thinned by a known mechanical method. Since the resin impregnating property is greatly improved by the fiber opening treatment as compared with the non-spread product, the physical properties of the molded article are also improved. The basis weight of the reinforcing fiber base material 104 is preferably in a range of 40 g/m$^2$ or more and 250 g/m$^2$ or less. By setting the basis weight to 40 g/m$^2$ or more, the number of reinforcing fibers in the molded article can be increased, so that desired mechanical properties can be obtained. Further, by setting the basis weight to 250 g/m$^2$ or less, it becomes easy to sufficiently impregnate the resin inside the reinforcing fiber base material 104.

Step b:

In the step b, as shown in FIGS. 5(b) and 5(c), the resin-attached fiber base material 104A is subjected to a heat treatment so that the fine powder 105 of the raw resin composition is incompletely melted and then solidified. Thus, the prepreg 106 having a partially fused structure 105A of the raw resin composition is formed. Here, "incompletely melt" means that all of the fine powder 105 of the raw resin composition is not melted into droplets and flows, but a part of the fine powder 105 is completely becomes liquid droplet. This means that most of the fine powder 105 becomes liquid droplets only on the surface and is melted only to the state where the solid state is maintained in the central portion. In the "partially fused structure 105A", in the vicinity of the surface layer portion of the reinforcing fiber base material 104, the fine powder 105 is partially melted by heat treatment, and the melt of the adjacent fine powder 105 is fused, and then solidified to form a network connected to each other. By the partially fused bonding structure 105A, the adhesion of the fine powder 105 to the reinforcing fiber base material 104 is enhanced, the falling off of the fine powder 105 can be prevented, and a constant air permeability in the thickness direction of the reinforcing fiber base material 104 is ensured. Therefore, in the heating and pressing treatment in the step B described later, an escape path for the air in the reinforcing fiber base material 104 is secured, and the generation of voids can be avoided. It is preferable that the partially fused structure 105A is formed uniformly over the entire surface of the prepreg 106, but may be unevenly distributed microscopically.

FIG. 5(c) shows a state in which the partially fused structure 105A is formed on one surface of the prepreg 106. However, the partially fused structure 105A may be formed on both surfaces of the prepreg 106.

(Heat Treatment Conditions)

In the heat treatment, the fine powder 105 of the raw resin composition is incompletely melted to form the partially fused structure 105A. To do so, it is preferable to perform the heat treatment at a temperature generally in a range of 100° C. to 400° C., although the heat treatment depends on the melting point and Tg of the raw resin composition to be used. Further, when the raw resin composition is a crystalline resin, it is more preferably performed at a temperature equal to or lower than the melting point, and when the raw resin composition is a non-crystalline resin, it is more preferable to perform it at a temperature within Tg+150° C. When the heat treatment temperature exceeds approximately 400° C., the thermal melting of the fine powder 105 proceeds excessively, so that the partially fused structure 105A is not formed, and the air permeability may be impaired. On the other hand, when the heat treatment temperature is lower than about 100° C., the partially fused structure 105A is not formed, and the heat fusion to the reinforcing fiber base material 104 becomes insufficient. During handling of the prepreg 106, there is possibility that falling off, detachment etc. of the fine powder 105 may occur.

The heat treatment time is not particularly limited as long as the fine powder 105 of the raw resin composition adhered to the reinforcing fiber base material 104 can be fixed to the reinforcing fiber base material 104, but is preferably, for example, 1 to 5 minutes. That is, by performing the heat treatment in a much shorter time than at the time of molding, the resin can be fixed to the reinforcing fiber base material 104 in the state of the partially fused structure 105A, and powder dropping can be prevented.

At the stage of the prepreg 106 after the heat treatment, the raw resin composition (the partially fused structure 105A and the fine powder 105 as it is) is concentrated near the surface of the reinforcing fiber base material 104, and is not delivered to the inside of the reinforcing fiber base material 104 as in a molded article after heat-pressing in the step B described later. The heat treatment may be performed in a state where the resin-attached fiber base material 104A and the metallic member 11 are in contact with each other.

(Method A2)

Method A2 is a method in which step a and step b in the above-described Method A1 are performed collectively. That is, although not shown, the fine powder 105 of the raw material resin composition which is solid at an ordinary temperature is adhered to at least one surface of the sheet-like reinforcing fiber base material 104 heated to a predetermined temperature by a powder coating method, and is incompletely melted and then solidified to form a prepreg 106 on which the partially fused structure 105A is formed. In Method A1, the powder-coated fine powder 105 is fixed to the reinforcing fiber base material 104 by heat treatment. In Method A2, the fine powder 105 is powder-coated on the preheated reinforcing fiber base material 104. As a result, it is different in that the partially fused structure 105A is formed by fusing simultaneously with coating to the reinforcing fiber base material 104.

Since various processing conditions in Method A2 are the same as those in Method A1, detailed description will be omitted.

(Thickness of Prepreg)

The thickness of the prepreg 106 obtained in the step A is preferably in the range of 40 µm or more and 200 µm or less, more preferably in the range of 50 µm or more and 150 µm or less. By setting the thickness of the prepreg 106 to 40 µm or more, handleability is improved, and impregnation failure due to insufficient resin can be avoided. By setting the thickness of the prepreg 106 to 200 µm or less, the reinforcing fiber base material 104 can be sufficiently impregnated with the molten resin in the step B described later, and the mechanical strength can be improved.

(Permeability of Prepreg)

The prepreg 106 preferably has an air permeability in the thickness direction of 500 cc/cm$^2$/sec or more and 1000 cc/cm$^2$/sec or less when the thickness is 40 to 200 µm, and more preferably 700 cc/cm$^2$/sec or more and 900 cc/cm$^2$/sec or less. By setting the air permeability to 500 cc/cm$^2$/sec or more, air escape routes in the prepreg 106 increase in the heat-pressing treatment in step B described later, and voids are less likely to be generated. That is, in bonding with the dense metallic member 11, it is important that air existing in the prepreg 106 is released in the thickness direction to the side opposite to the bonding surface, and thus by controlling the air permeability to 500 cc/cm$^2$/sec, it becomes easy to deaerate from the prepreg 106. On the other hand, when the air permeability is set to 1000 cc/cm$^2$/sec or less, the fine powder 105 of the raw resin composition is less likely to fall off, and the handlability can be improved.

The prepreg 106 preferably has an uneven surface having an arithmetic average roughness (Ra) as the surface roughness, in the range of 0.010 mm or more and 0.100 mm or less and more preferably in the range of 0.015 mm or more and 0.075 mm or less. When the Ra is within the above range, the air in the prepreg 106 can escape from the lateral surface in the heat-pressing treatment in the step B described later. For this reason, even in the bonding in which the prepreg 106 is sandwiched between the dense metallic members 11, the prepreg 106 and the metallic member 11 are firmly bonded, and the metal-FRP composite 1 having an excellent mechanical strength is obtained. If the Ra is less than 0.010 mm, the prepreg 106 and the prepreg 106, or the prepreg 106 and other prepregs are easily fused to each other by the heat-pressing treatment, and thus there becomes no air escape route which causes a void generation. If Ra exceeds 0.100 mm, voids may remain undesirably.

(Resin Concentration Gradient in Prepreg)

In the prepreg 106 on which the partially fused structure 105A of the raw resin composition is formed, preferably 10% by mass or more, and more preferably 10% by mass or more and 40% by mass or less of the raw resin composition is attached to the reinforcing fiber base material 104 in the range of 0 to 50% in the thickness direction with respect to the thickness of the reinforcing fiber base material 104 on the basis of the edge surface of the original reinforcing fiber base material 104. As described above, by providing a gradient in the attached concentration of the raw material resin composition, when the surface of the prepreg 106 on which the partially fused structure 105A is formed is brought into contact with the metallic member 11 and heated and pressed in the next step B, the molten resin can be sufficiently spread on the boundary between the prepreg 106 and the metallic member 11. That is, by utilizing the property of the metallic member 11 having a high thermal conductivity and being easily heated, a high-concentration solid raw material resin composition including the partially fused structure 105A is brought into contact with the surface of the metallic member 11, melting of the resin is promoted, and a large amount of molten resin can be supplied to the bonding boundary. Therefore, not only the raw resin composition having a relatively high melt viscosity can permeate the entire prepreg 106 in a short time, but also the resin layer 101 can be formed. It is to be noted that if the resin concentration on the side to be bonded to the metallic member 11 is increased by forming the partial fused structure 105A, the air permeability is controlled to be within the above range. As a result, air present in the prepreg 106 in the step B can be escaped to the side opposite to the bonding surface in the thickness direction of the prepreg 106, and thus occurrence of voids can be avoided.

<Step B>

Figure 6:
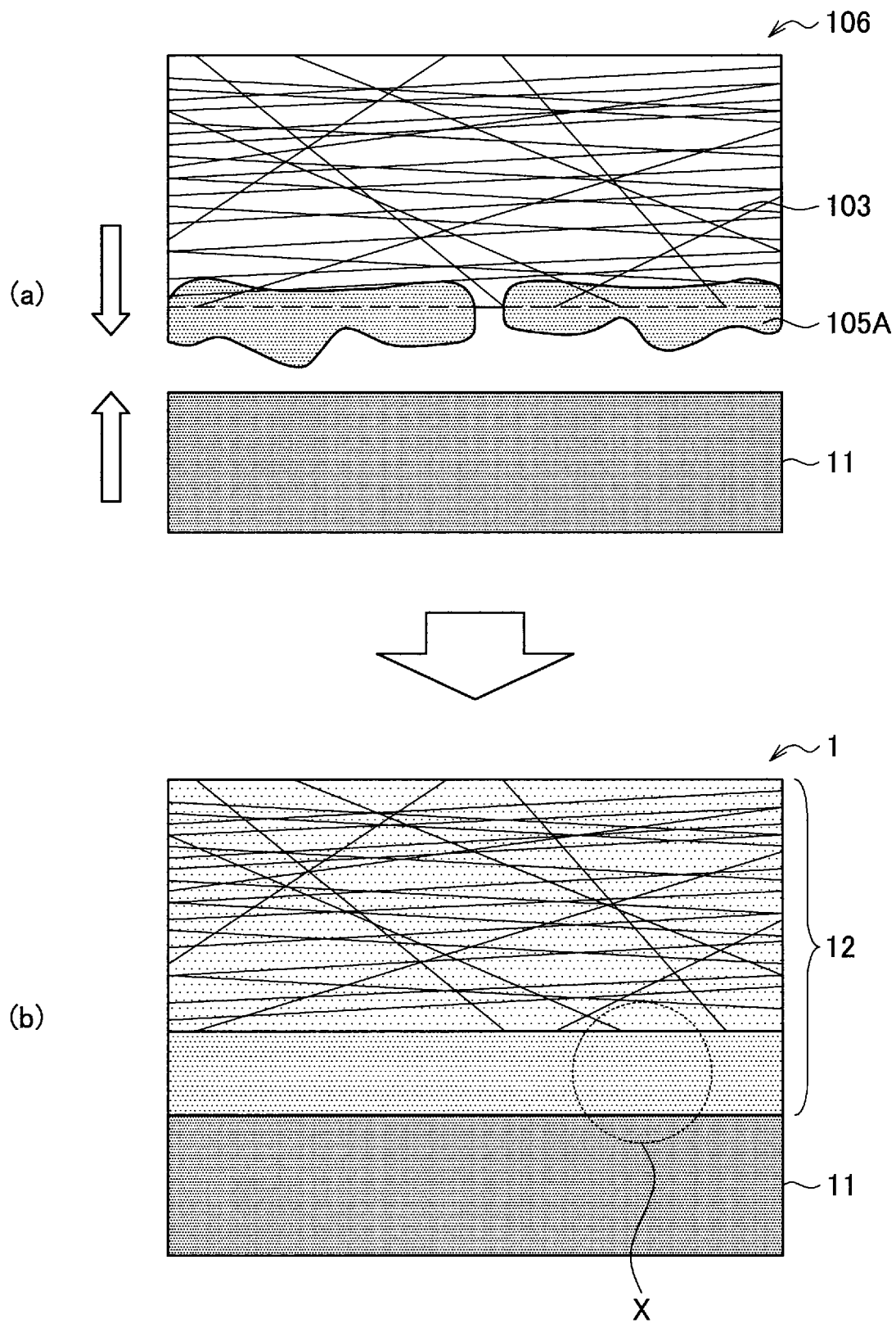
FIG. 6 is an explanatory diagram showing an example of a subsequent production process of FIG. 5.
Figure 7:
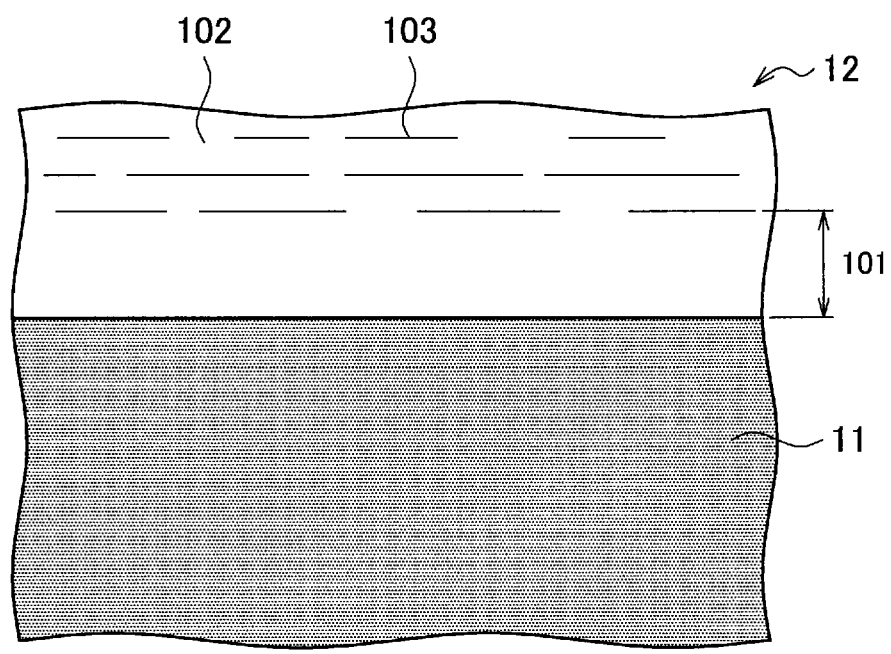
FIG. 7 is a schematic view showing an enlarged cross-section of portion X in FIG. 6.

In the step B, as shown in FIGS. 6(*a*) and 6(*b*), the surface of the prepreg 106 on which the partially fused structure 105A is formed, obtained in step A is brought into contact with the surface of the metallic member 11, and the metallic member 11 and the prepreg 106 are thermocompression-bonded by performing the heat pressing treatment. By the heat pressing treatment, the raw resin composition adhering to the prepreg 106 is completely melted and spread (leaching) on the surface of the metallic member 11, and at the same time, it is impregnated into the reinforcing fiber base material 104. By solidifying or curing the raw resin composition impregnated in this way, it becomes a matrix resin 102, an FRP layer 12 as a fiber-reinforced resin material is formed, and this FRP layer 12 is bonded to the metallic member 11. Further, in step B, the partially fused structure 105A of the raw resin composition in the prepreg 106 comes into contact with the metallic member 11 in the heat pressing treatment and spreads into a thin film form, and thus the reinforcing fiber material 103 hardly exists (exists only in an amount of only 5% by mass or less). As a result, it is possible to form the resin layer 101 substantially made of only the resin. Thus, the metal-FRP composite 1 in which the FRP layer 12 and the metallic member 11 are firmly bonded is formed.

In the thermocompression bonding step in step B, the raw resin composition is completely melted into a liquid state by heating, and permeates into the prepreg 106 by pressure. In the prepreg 106 controlled to a predetermined air permeability, an air escape route is secured, so that the molten resin permeates while expelling air. Accordingly, impregnation is completed in a short time even at a relatively low pressure, and occurrence of voids can also be avoided.

The thermocompression bonding temperature can be appropriately set depending on the melting point and Tg of the raw resin composition used in order to completely melt the fine powder 105 of the raw resin composition and the partially fused structure 105A and impregnate the entire reinforcing fiber base material 104. The thermocompression bonding conditions such as temperature will be described later.

In the step B, the metallic member 11 and the prepreg 106 may be formed into any three-dimensional shape simultaneously with the thermocompression bonding. In this case, it is preferable that the pressure when the metallic member 11 and the prepreg 106 are pressed and formed is based on the pressure required for press-forming the metallic member 11. In Production Method 1, it is preferable to form a composite having a three-dimensional shape by simultaneously molding the metallic member 11 and the prepreg 106. It is also a suitable method that, in the step B, the metallic member 11 is preferably formed into any three-dimensional shape in advance, and then, the prepreg 106 is press-bonded.

The batch molding of the metallic member 11 and the FRP layer 12 by the pressure molding machine is preferably performed by hot pressing, but the material preheated to a predetermined temperature may quickly be provided in the low-temperature pressure molding machine for processing. When the members are provided in the heat molding machine, the metallic member 11 and the prepreg 106 may be temporarily fixed in advance. The temporary fixing condition is not particularly limited as long as the partially fused structure 105A of the prepreg 106 is maintained and air permeability is ensured.

The obtained metal-FRP composite 1 comprises a metallic member 11 and an FRP layer 12 as a fiber-reinforced resin material, as shown in FIG. 6(*b*). As shown in FIGS. 6(*b*) and 7, the FRP layer 12 includes a matrix resin 102 and a reinforcing fiber material 103 which is a composite reinforcing fiber contained in the matrix resin 102. Further, in the FRP layer 12, as its portion thereof, a resin layer 101 is formed between a surface of the metallic member 11 and the reinforcing fiber material 103 which is closest to the surface. Further, a resin layer 101 is formed as follows. The fine powder 105 of the raw resin composition adhered to the surface of the prepreg 106 on the side on which the partially fused structure 105A is formed is brought contact with the metallic member 11 in the thermocompression bonding in the step B to wet to spread as a thin film, and the resulting melt is solidified or cured to form the resin layer 101. The resin layer 101 is a layer made of substantially only a resin, in which the reinforcing fiber material 103 hardly exists. That is, although the possibility that fibers detached from the reinforcing fiber material 103 may be mixed in the resin layer 101 cannot be denied, the resin layer 101 does not include a sufficient amount of fibers to reinforce the resin.

In the above-mentioned Production Method 1, an oil-surface bonding adhesive may be added to the resin composition. The specific method of addition is not particularly limited, but examples thereof include the following methods. When the oil-surface bonding adhesive is liquid, the raw resin composition is finely cut, pulverized, and mixed with the oil-surface bonding adhesive, and the resulting mixture is used as a raw material and perform the same steps as in the above-described Production Method 1 As a method of cutting and pulverizing, the above-mentioned method of pulverization may be used. When the oil-surface bonding adhesive is solid, the oil-surface bonding adhesive is dissolved in an organic solvent, the solution is mixed with the raw resin composition, and the organic solvent is volatilized and dried. Using this as the raw material, the same steps as in the Production Method 1 described above may be performed. Further, the same steps as in the above-described Production Method 1 may be performed using a mixture obtained by physically cutting, pulverizing, and mixing the oil-surface adhesive and the raw material resin composition with a stirrer or the like.

[Production Method 2]

Next, Production Method 2 will be described with reference to FIG. 8. In Production Method 2, after a coating film 20 (which will later become the resin layer 101) made of the raw resin composition is formed on the surface of the metallic member 11, the FRP or the FRP molding prepreg formed into a desired shape which will later become the FRP layer 12 is laminated and heat-pressed to produce the metal-FRP composite 1. The FRP molding prepreg 21 is a precursor of FRP. In Production Method 2, the coating film 20 may be formed on the side of the FRP or the FRP molding prepreg 21, which will later become FRP, instead of the side of the metallic member 11. However, hereinafter, the case of forming the coating film 20 on the metallic member 11 side will be described as an example.

Figure 8:
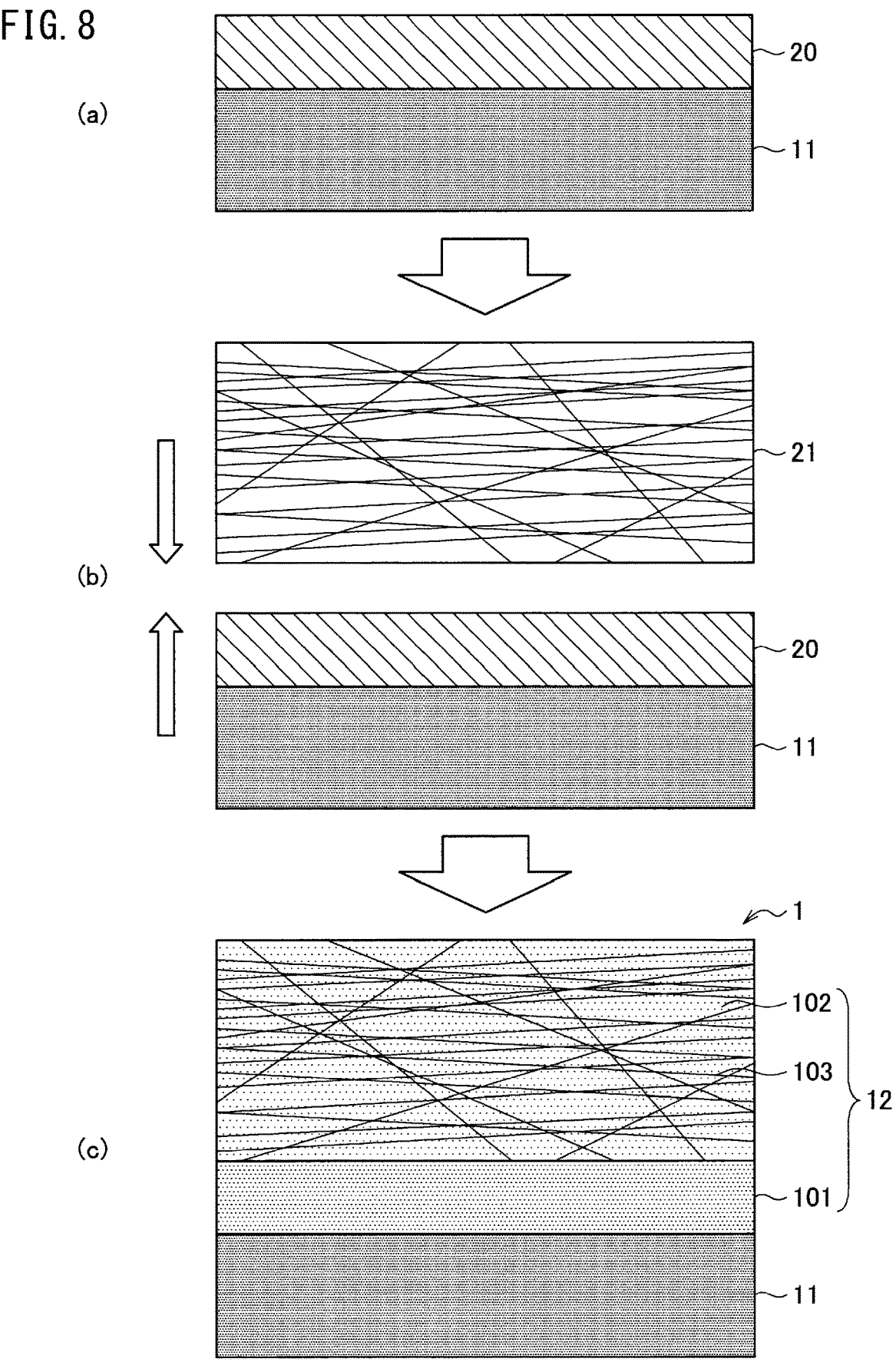
FIG. 8 is an explanatory diagram showing another example of a production process of the metal-fiber-reinforced resin material composite according to the same embodiment.

First, as shown in FIG. 8(*a*), a powdery or liquid raw resin composition is applied to at least one surface of the metallic member 11 to form a coating film 20. The above-mentioned oil-surface bonding adhesive may be added to the raw resin composition. The method of addition may be the same as the method described in Production Method 1.

Figure 5:
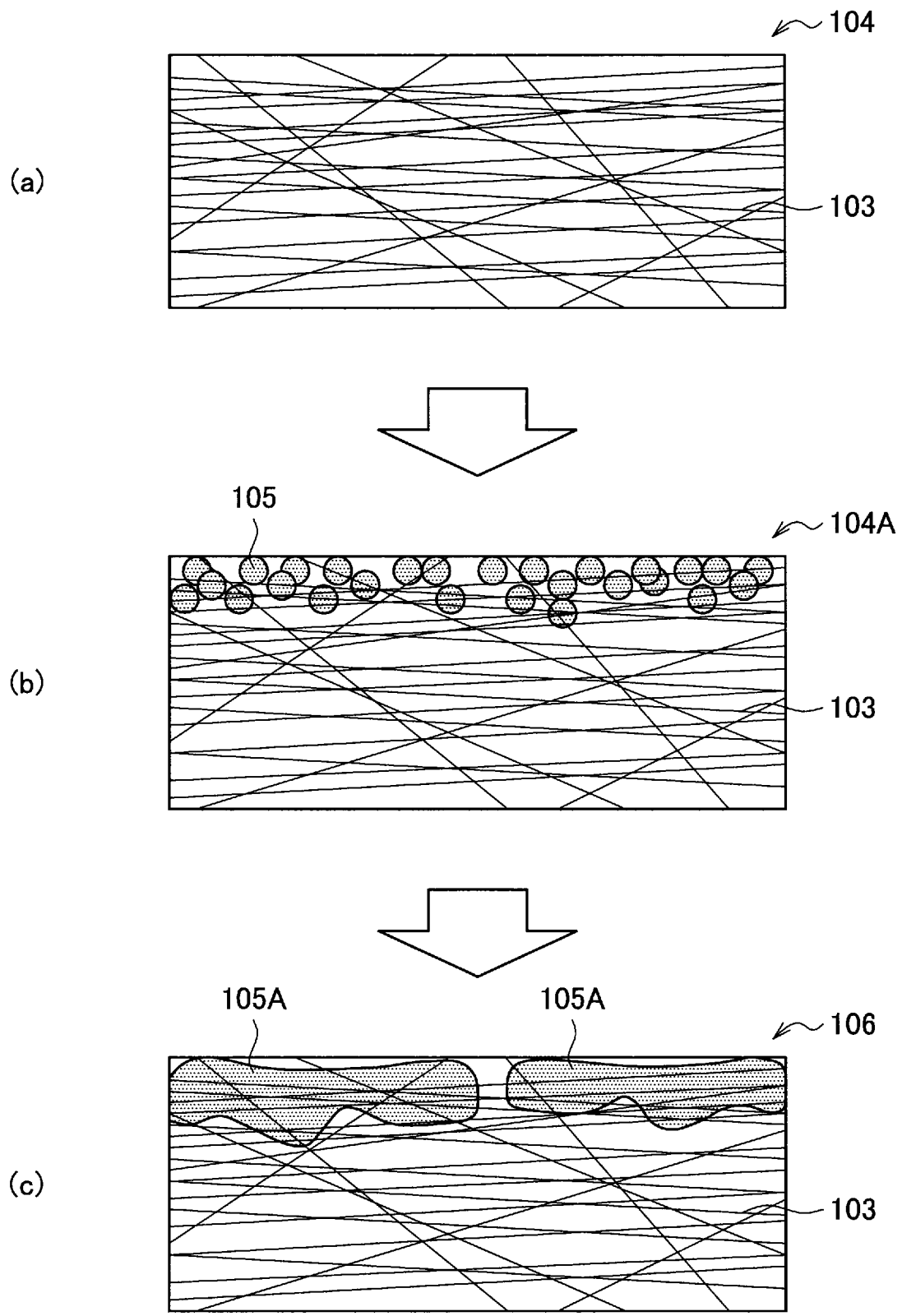
FIG. 5 is an explanatory diagram showing one example of a production process of the metal-fiber-reinforced resin material composite according to the same embodiment.

Next, as shown in FIG. 5 (*b*), an FRP molding prepreg 21 which will later become the FRP layer 12 is disposed on the side of the metallic member 11 on which the coating film 20 is formed. In this way, a laminate stacked to each other in the order of the metallic member 11, the coating film 20 and the FRP molding prepreg 21 are formed. In FIG. 8(*b*), instead of the FRP molding prepreg 21, an FRP can be laminated. In this case, the bonding surface of the FRP is preferably activated by being roughened by blasting or the like, plasma treatment, corona treatment, or the like.

Next, by heating and pressing the laminate formed, a metal-FRP composite 1 is obtained as shown in FIG. 8 (*c*).

In Production Method 2, as a method of forming the coating film 20 which will later become the resin layer 101, a method of powder-coating a powder of the raw resin composition on the surface of the metallic member 11 is preferable. The resin layer 101 formed by powder coating is easily melted because the raw resin composition is fine particles, and has a suitable space in the coating film 20 so that voids are easily removed. Therefore, when the FRP or the FRP molding prepreg 21 is heated and pressed, the raw resin composition wets the surface of the metallic member 11 well, so that a degassing step such as in varnish coating is not required, and defects due to insufficient wettability such as voids seen in a film are unlikely to occur.

In Production Method 2, the coating film 20 is formed on both surfaces of the metallic member 11 in FIG. 8(a), and the FRP molding prepreg 21 (or FRP) is laminated to both the coating films 20 in FIG. 8(b). Alternatively, two or more metallic members 11 may be used to laminate the fiber-reinforced resin material including the FRP layer 12 so as to interpose the fiber-reinforced resin material in a sandwich shape. Further, an FRP molding prepreg (or FRP) which will become the FRP layer 13 may be laminated.

[Production Method 3]

Figure 9:
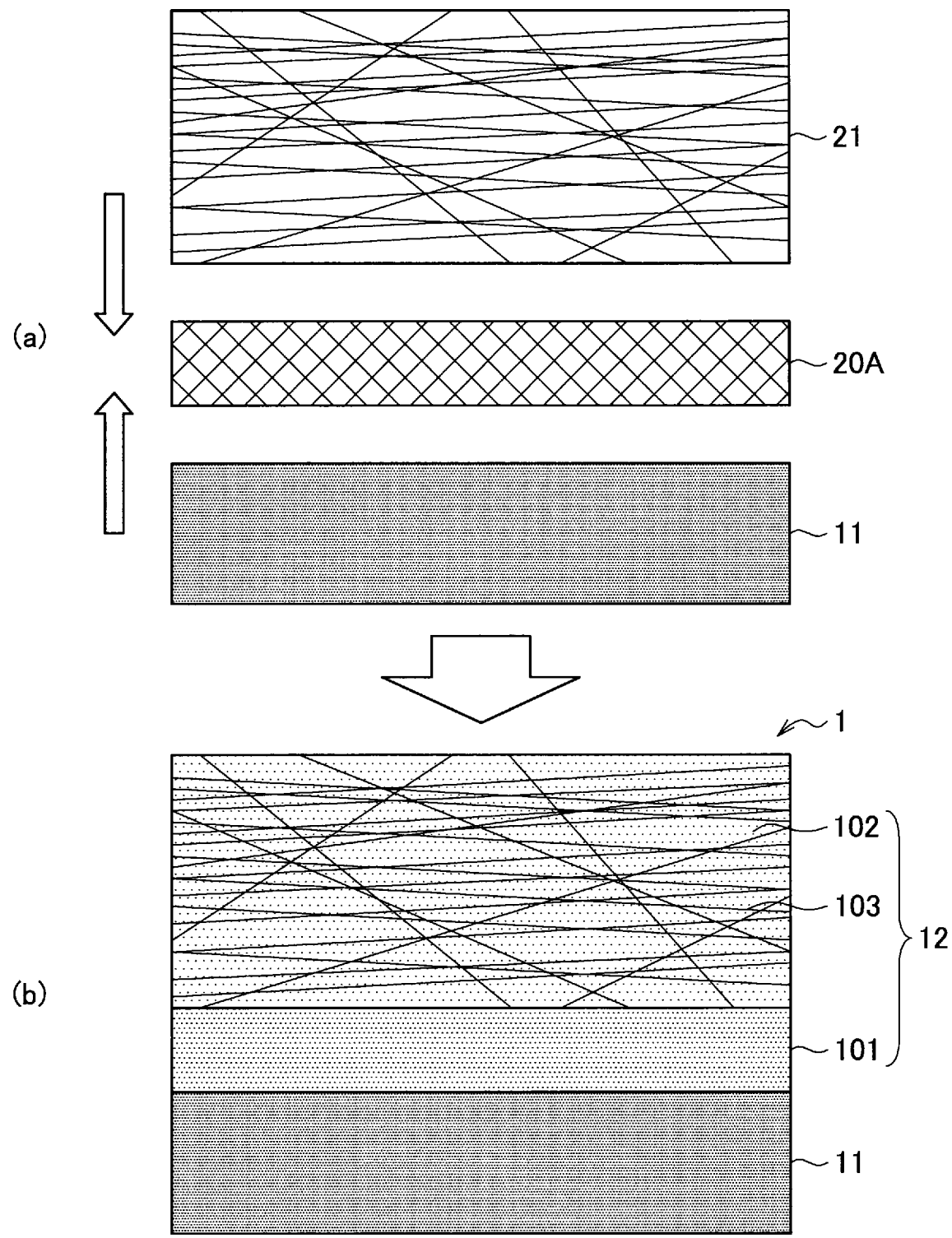
FIG. 9 is an explanatory diagram showing another example of a production process of the metal-fiber-reinforced resin material composite according to the same embodiment.

Next, Production Method 3 will be described with reference to FIG. 9. In Production Method 3, the metal-FRP composite 1 is produced by laminating the raw resin composition in the form of a film and the FRP or the FRP molding prepreg 21 which will later be the FRP layer 12 on the metallic member 11 and thermocompression bonding the resulting laminate.

In this Production Method 3, for example, as shown in FIG. 9(a), on at least one surface of the metallic member 11, the resin sheet 20A made of the raw resin material in the form of a film and the FRP molding prepreg 21 which will later be FRP layer 12 are laminated in this order to form a laminate. The above-described oil-surface bonding adhesive may be added to the resin sheet 20A. In FIG. 9(a), instead of the FRP molding prepreg 21, an FRP can be laminated. However, in this case, the bonding surface of the FRP is preferably activated by roughening by blasting or the like, plasma treatment, corona treatment, or the like.

Next, by heating-pressing the laminate, the metal-FRP composite 1 is obtained as shown in FIG. 9(b).

In Production Method 3, in FIG. 9(a), the resin sheet 20A and the FRP molding prepreg 21 (or FRP) may be laminated on each of surfaces of the metallic member 11, respectively.

Alternatively, two or more metallic members 11 may be used to laminate the fiber-reinforced resin material including the FRP layer 12 so as to interpose the fiber-reinforced resin material in a sandwich shape. Further, an FRP molding prepreg (or FRP) which will later become the FRP layer 13 may be laminated.

(Thermocompression Bonding Conditions)

In the Production Methods 1 to 3, the thermocompression bonding conditions for forming a composite of the metallic member 11, the resin sheet 20A, and the FRP molding prepreg 21 (or FRP) which will later be FRP layer 12 are as follows.

The thermocompression bonding temperature is not particularly limited, but is, for example, in the range of 100° C. or more and 400° C. or less, preferably 150° C. or more and 300° C. or less, more preferably in the range of 160° C. or more and 270° C. or less, and further preferably in the range of 180° C. or more and 250° C. or less. Within such a temperature range, a temperature no lower than the melting point for a crystalline resin is more preferable, and a temperature of Tg+150° C. or higher is more preferable for a non-crystalline resin. If the temperature exceeds the upper limit temperature, the resin may decompose due to the application of excessive heat, and if the temperature is lower than the lower limit temperature, the melt viscosity of the resin is high, and thus the adhesiveness to the reinforcing fiber material and the impregnation property to the reinforcing fiber base material becomes worse.

The pressure at the time of thermocompression bonding is, for example, preferably 3 MPa or more, and more preferably in the range of 3 MPa or more and 5 MPa or less. If the pressure exceeds the upper limit, an excessive pressure is applied, which may cause deformation or damage. If the pressure is lower than the lower limit, the impregnating property to the reinforcing fiber base material is deteriorated.

About the thermocompression bonding time, the thermocompression bonding can be sufficiently performed if it is done for at least 3 minutes or more, and it is preferable that it is done for 5 minutes or more and 20 minutes or less. However, in Production Method 1, the impregnation time can be reduced as compared with the film stack method in Production Method 3, for example, by controlling the partially fused bonding structure 105A, the concentration gradient of the resin and the air permeability described above. As a result, the thermocompression bonding can be performed in a period of at least one minute, or longer, and the thermocompression bonding time is preferably in the range of 1 to 10 minutes.

In the thermocompression bonding step, the composite batch molding of the metallic member 11, the resin sheet 20A, and the FRP molding prepreg 21 (or FRP) which will later be FRP layer 12 may be performed by a pressure molding machine. The composite batch molding is preferably performed by a hot press, but the material preheated to a predetermined temperature may be promptly disposed in a low-temperature press molding machine for processing. By performing the above-mentioned thermocompression bonding process, the FRP layer 12 can be bonded to the metallic member 11 in a state where a compressive force (internal stress) is applied to the FRP layer 12, and thus the super-law-of-mixture can be exhibited.

Here, when the metallic member 11 and the FRP molding prepreg 21 (or FRP) which will later become the FRP layer 12 are heat-pressed to form a composite, the temperature of the metallic member 11 side is preferably set a temperature higher than the temperature of the FRP molding prepreg 21 (or FRP). Specifically, for example, in a state where the metallic member 11 is preheated, the metallic member 11 may be provided and processed in a pressure molding machine together with the FRP molding prepreg 21 (or FRP) not preheated. In this way, by setting the temperature of the metallic member 11 side higher than the temperature of the FRP molding prepreg 21 (or FRP), the matrix resin 102 from the FRP layer 12 can be more reliably leached out, and the metallic member 11 and the FRP layer 12 can be more firmly bonded.

(Additional Heating Step)

In Production Methods 1 to 3, when a crosslinkable resin composition comprising a crosslinkable curable resin (B) and a crosslinking agent (C) in addition to the phenoxy resin (A) is used, as the resin composition for forming the resin layer 101 and the raw material resin for forming the matrix resin 102, an additional heating step may be further included.

When a crosslinkable resin composition is used, the FRP layer 12 including the resin layer 101 and the matrix resin 101 which has been solidified in the first cured state but has not been crosslinked (cured) in the thermocompression bonding step. That is, through the above-mentioned thermocompression bonding step, it is possible that the metallic member 11, and the FRP layer 12 including the resin layer 101 of the cured product (solidified product) in the first cured state are laminated and integrated to form an intermediate (preform) of the metal-FRP composite 1. Then, after the thermocompression bonding process, an additional heating process is performed on the intermediate to post-cure the resin layer 101 of at least the cured product (solidified product) in the first cured state in order to make the resin crosslinked and cured to change into a cured product in a second cured state (crosslinked cured product).

The above intermediate may include, in addition to the FRP layer 12, another FRP layer 13 laminated to the FRP layer 12. In this case, the matrix resin of the FRP layer 13 may be in a first cured state formed using a crosslinkable resin composition as a raw material. In this case, the matrix resin of the FRP layer 13 can also be crosslinked and cured by post-cure to obtain a crosslinked cured product in the second cured state.

The additional heating step for post-curing is preferably performed, for example, at a temperature in the range of 200° C. or more and 250° C. or less for about 30 minutes to 60 minutes. Note that, instead of the post-curing, a thermal hysteresis in a post process such as painting may be used.

As described above, when the crosslinkable resin composition is used, Tg after crosslinking and curing is greatly improved as compared with the phenoxy resin (A) alone. Therefore, before and after the additional heating step is performed on the above-mentioned intermediate, that is, in the process that the resin changes from a cured product (solidified product) in the first cured state to a cured product (crosslinked cured product) in the second cured state, Tg changes. Specifically, the Tg of the resin before crosslinking in the intermediate is, for example, 150° C. or less, whereas the Tg of the crosslinked resin after the additional heating step is, for example, 160° C. or more, preferably 170° C. or more and 220° C. or lower, and thus the heat resistance can be significantly increased.

(Pretreatment Step)

When the metal-FRP composite 1 is manufactured, as a pretreatment step of forming a composite of the metallic member 11 and the FRP molding prepreg 21 (or the FRP), the metallic member 11 is preferably degreased. It is more preferable to perform release treatment to mold or remove the attached matter on the surface of the metallic member 11 (dust removal). Except for a steel plate having a very high adhesion such as TFS (Tin Free Steel), it is difficult for the metallic member 11 such as a steel plate to which rust-preventive oil or the like is adhered to obtain a strength exceeding the above-described law of mixture unless its adhesion is restored by degreasing. Therefore, by performing the above pretreatment on the metallic member 11, the metal-FRP composite 1 may easily obtain a strength exceeding the law of mixture. Regarding the necessity of degreasing, it is sufficient to check and judge whether or not a laminate actually exhibits the super-law-of-mixture, wherein the laminate comprises the target metallic member preliminarily bonded and integrated with the target FRP with the target adhesive resin composition without degreasing step. Regarding the judgement whether or not the super-law-of-mixture is exhibited will be described later in the [Confirmation of Presence or Absence of Super-law-of-mixture]. As described above, in addition to or instead of the degreasing treatment, the oil-surface bonding adhesive may be added to the resin composition or the oil-surface bonding adhesive may be applied to the interface between the FRP layer 12 and the metallic member 11.

(Post-Step)

In the post-step for the metal-FRP composite 1, in addition to painting, drilling for mechanical bonding with other members such as bolting and riveting, and application of an adhesive for adhesive bonding, and the like are performed.

Effects of Present Embodiment

According to the embodiment described above, the metal-FRP composite 1 in which the metallic member 11 and the fiber-reinforced resin material including the FRP layer 12 is firmly bonded via the resin layer 101 which is a part of the FRP layer 12 are provided. This metal-FRP composite 1 is lightweight, excellent in workability, and can be manufactured by a simple method. For example, even if the metallic member 11 is a steel material subjected to a rustproofing treatment, the metallic member 11 and the fiber-reinforced resin material including the FRP layer 12 have a high adhesive strength without performing a special surface roughening treatment or the like. In addition, when forming a composite of the metallic member 11 and the FRP which will later be the FRP layer 12, it can be done in a batch process simultaneously with the molding of the metallic member 11 by hot pressing, so that the manufacturing cost can be reduced. Therefore, the metal-FRP composite 1 of the above-described embodiments is lightweight and high-strength material, and can be suitably used not only as housings for electric/electronic devices, but also as structural members in applications such as automobile members and aircraft members. Furthermore, according to the metal-FRP composite 1, all six problems when using the above-described FRP for an automobile member can be solved, so that the metal-FRP composite can be particularly suitably used as an automobile member.

EXAMPLES

The present invention will be described more specifically with reference to the following examples, but the present invention is not limited to these examples. Incidentally, the test and the measuring method of various physical properties in these Examples are as follows.

[Average Particle Diameter (D50)]

The average particle diameter was measured by a laser diffraction/scattering type particle size distribution measuring device (Microtrack MT3300EX, manufactured by Nikkiso Co., Ltd.) when the cumulative volume became 50% on a volume basis.

[Melt Viscosity]

Using a rheometer (manufactured by Anton Paar), a sample size of 4.3 cm$^3$ was sandwiched between parallel plates, and the temperature was raised at 20° C./min, the melt viscosity was measured at a frequency of 1 Hz and at a load strain of 5% at 180° C.

[Resin Content (RC:%)]

It was calculated from the weight (W1) of the reinforcing fiber base material before the application of the matrix resin and the weight (W2) of the FRP molding material after the application of the resin using the following formula.

Resin content (RC: %)=(W2−W1)/W2×100

W1: Weight of reinforcing fiber base before application of resin

W2: Weight of FRP molding material after application of resin

[Measurement of Thickness of Resin Layer]

The thickness of the resin layer was measured by the method mentioned earlier.

[Measurement of Tensile Load and Tensile Modulus (Elastic Modulus)]

JIS K 7164: 2005 The mechanical properties (tensile strength and tensile modulus) of the metal-FRP composite obtained according to the test conditions for isotropic and orthotropic fiber reinforced plastics were measured. The tensile load is obtained by multiplying the tensile strength by the cross-sectional area of the test specimen (tensile strength ($N/mm^2$)=tensile load (N)/cross-sectional area of test specimen ($mm^2$)). The dimensions of the test specimens were 200 mm×25 mm.

Figure 10:
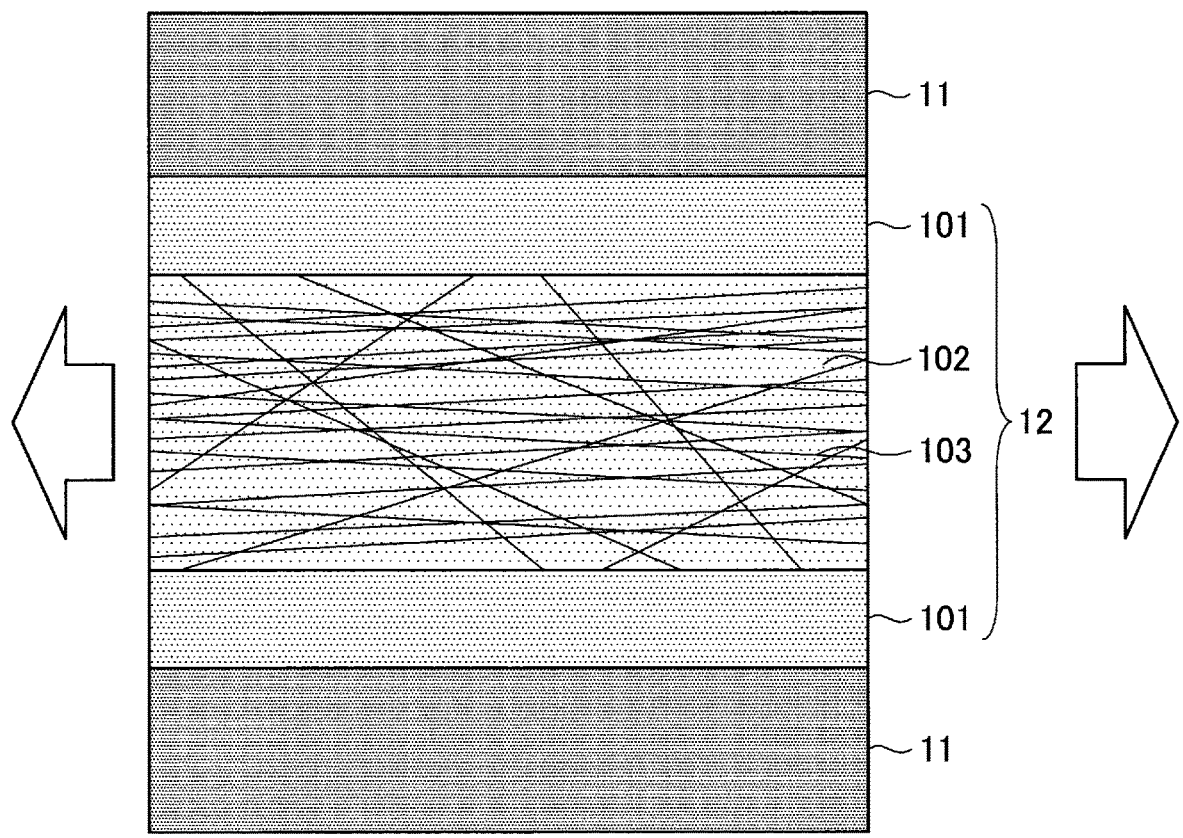
FIG. 10 is an explanatory diagram showing a configuration of a sample of a metal-FRP composite for a tensile test in Examples and Comparative Examples.

Here, as schematically shown in FIG. 10, the metallic members 11 are arranged on both sides of the FRP laminate in which the FRP layer 12 and the resin layer 13 are laminated. A sample of a metal-FRP composite for a tensile test was obtained by thermocompression bonding under the conditions shown in each of Examples and Comparative Examples. The direction of the arrow in FIG. 10 indicates the direction in which the load is applied.

[Confirmation of Presence or Absence of Super-Law-of-Mixture]

Confirmation of whether or not the super-law-of-mixture was expressed was performed as follows. The metallic member 11 and the FRP layer 12 (here, the prepreg before the FRP layer 12 is integrated with the metallic member 11) are individually subjected to a tensile test by the above-described measurement method, and the maximum load (load A1, B) is measured. Next, the tensile test is performed also on the metal-FRP composite in which the metallic member 11 and the FRP layer 12 are formed into a composite by the above-described measurement method, and the maximum load (load C) is measured. Further, based on the deformation amount D when the load C is measured (the deformation amount of the metal-FRP composite at break) and based on the result of the tensile test of the metallic member 11, the tensile load (load A2) of the metallic member 11 at the deformation amount D is determined. Then, whether or not Formulae (2-1) and (2-2) are satisfied decided. If at least Formula (2-2) is satisfied, it is determined that the super-law-of-mixture is realized. In this Example, Formula (2-1) is defined as "criterion 1", and Formula (2-2) is defined as "criterion 2". A degree of the super-law-of-mixture is calculated by C/(A2+B), but when criterion 1 is also satisfied, a degree of the law of the over-mixture corresponding to criterion 1 is calculated as C/(A1+B). The degree of the super-law-of-mixture is preferably 1.01 or more, and more preferably 1.05 or more. For example, when Formula (2-1) is satisfied, the maximum load of the composite is more than the total loads of each component alone, by preferably 1% or more, more preferably 5% or more. In this case, in the test specimen, it is preferable that the size of the metallic member and the FRP alone is the same as the size of the metallic member and the FRP layer in the composite test specimen. In the above-mentioned determination of necessity of degreasing (pretreatment step), the present method can also confirm the presence or absence of the super-law-of-mixture in advance.

If individual materials of the metallic member 11 and the FRP layer 12 is not available and only the metal-FRP composite is available, the metallic member 11 is peeled off from the FRP layer 12 to obtain individual members, respectively. If it is difficult to peel off, using a grinder or the like to which a diamond whetstone has adhered, a material in which only the metallic member 11 of the metal-FRP composite has been scraped off, and a material in which only the FRP layer 12 has been scraped off, are prepared. By performing the tensile test on the respective specimens, the tensile load of the individual component alone can be measured.

Specifically, cut out three test specimens from the metal-FRP composite. The size of each test specimen may be determined according to the size of the obtained metal-FRP composite or the like, but may be, for example, a strip having a width of 25 mm and a length of 200 mm. In order to prevent the test specimen from being damaged by a test specimen holding mechanism such as a chuck of a tensile tester, a glass epoxy tab generally specified in a standard such as JIS K7164: 2005 is attached to the test specimen. These are referred to as first to third test specimens. Then, by observing the cross section of any of the test specimens in accordance with the cross-sectional method of the optical method of JIS K 5600-1-7, 5.4, the thicknesses of the metallic member 11 and the FRP layer 12 were measured. Subsequently, the maximum load (Load C) of the metal-FRP composite is measured by performing the above-described tensile test on the first test piece. That is, the first test specimen is used as the metal-FRP composite 1.

On the other hand, the FRP layer 12 is removed from the second test specimen. The removal method is as described above. That is, the second test specimen is used as the metallic member 11. When the FRP layer 12 is scraped off, the metallic member 11 of about 5 to 10% of the measured thickness of the metallic member 11 may be scraped off. The error in the measured thickness is taken into account. On the other hand, there is no problem even if the resin layer 101 slightly remains on the metallic member 11. This is because the maximum load of the resin layer 101 is negligibly smaller than the maximum load of the metallic member 11. Next, the maximum load (load A1) of the metallic member 11 is measured by performing the above-described tensile test on the second test specimen. Further, a tensile load (load A2) of the metallic member 11 at the deformation amount D is obtained based on the deformation amount D when the load C is measured and the result of the tensile test of the metallic member 11.

On the other hand, the metallic member 11 is removed from the third test specimen. The removal method is as described above. That is, the third test specimen is used as the FRP layer 12. When the metallic member 11 is scraped off, the FRP layer 12 of about 5 to 10% of the measured thickness of the FRP layer 12 may be scraped off. The error in the measured thickness is taken into account. Next, the maximum load (Load B) of the FRP layer 12 is measured by performing the above-described tensile test on the third test specimen. Then, it may be determined whether or not the super-law-of-mixture is satisfied based on each measured value and Formulae (2-1) and (2-2) (preferably, Formula (2-2)). The method for measuring the tensile load of the respective materials, i.e., the metallic member and the FRP in the composite material in the case where the metallic member has been subjected to the surface treatment can be carried out in the same manner as described above. The method for measuring the tensile load of the metallic member 11 and the FRP in the composite material in the case where the metallic member 11 has been subjected to the surface treatment can be carried out in the same manner as described above.

[Bending Test]

JIS K 7074: 1988 The mechanical properties (whether or not the metallic member 11 and the FRP layer 12 were peeled off by bending) of the obtained metal-FRP composite material were measured in accordance with the bending test method for fiber-reinforced plastic. As shown in FIG. 11, an FRP laminate (a laminate of the FRP layer 12 and the FRP layer 13) is disposed on each side of the metallic member 11, and they are heat-pressed under the conditions shown in each of Examples and Comparative Examples. Thus, a sample of the metal-FRP composite for a bending test was obtained. The white arrow in FIG. 11 is the direction in which the load is applied. When the mechanical strength was measured and the sample was broken, if the metal plate was peeled off from the FRP laminate, then it was evaluated as x (peeled), and if not peeled, it was evaluated as o (no peel).

[Shear Test]

Figure 12:
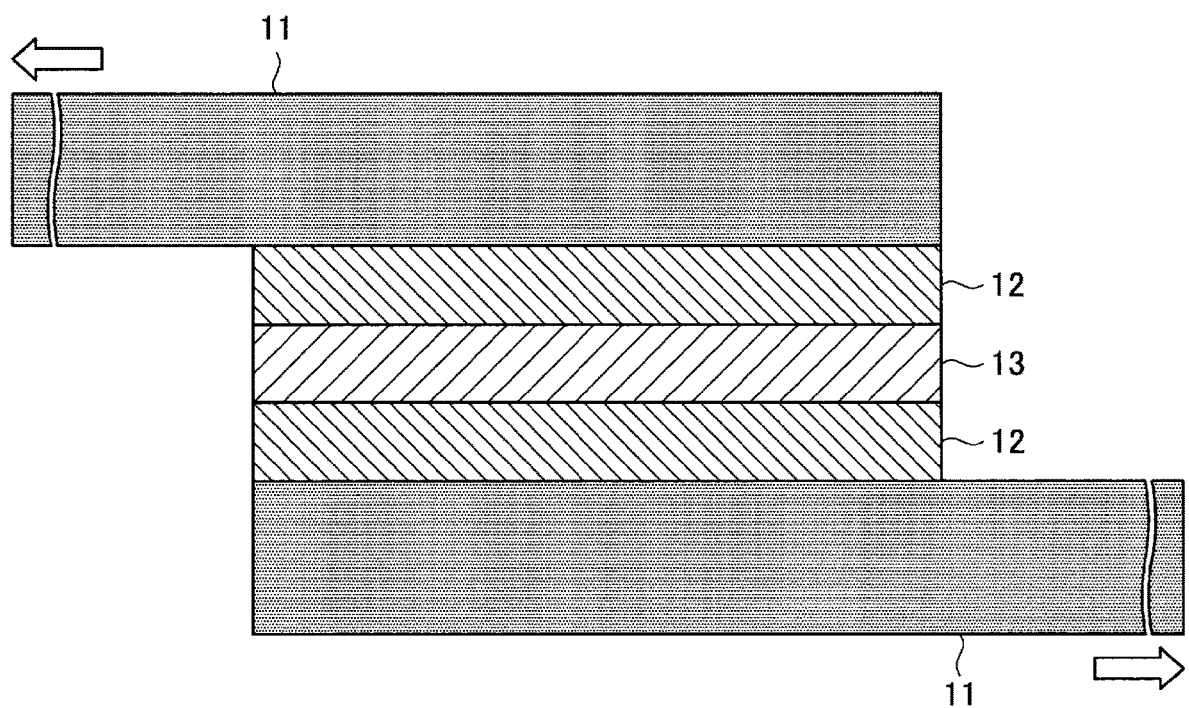
FIG. 12 is an explanatory diagram showing the configuration of a sample metal-fiber-reinforced resin material composite for a shear test in Examples and Comparative Examples.

JIS K 6850: 1999: the measurement was carried out with reference to the adhesive tensile shear strength test method. As shown in FIG. 12, two metallic members 11 processed to a size of 5 mm in width×60 mm in length are prepared. On the portion of 10 mm from the edge of each of the metallic members 11, FRP laminate (FRP layer 13/FRP layer 12 laminated in this order) was arranged and subjected to thermocompression bonding under the conditions shown in each of Examples and Comparative Examples to prepare a sample of a metal-FRP composite for a shear test. In other words, the sample of the metal-FRP composite for the shear test was prepared such that the above-described laminate sandwiched between the edge portions of the upper and lower two metallic members 11 and heat-pressed heat under the conditions shown in each of Examples and Comparative Examples. Two white arrows in FIG. 12 indicate the direction in which the tensile load is applied.

[FRP Prepreg]
Polyamide CFRP Prepreg
BHH-100GWODPT1/PA manufactured by Sakai Orbex Co., Ltd., Vf (fiber volume content): 47%
Polycarbonate CFRP Prepreg
BHH-100GWODPT1/PC manufactured by Sakai Orbex Co., Ltd., Vf (fiber volume content): 47%
Polypropylene CFRP Prepreg
BHH-100GWODPT1/PP manufactured by Sakai Orbex Co., Ltd., Vf (fiber volume content): 47%

[Phenoxy Resin (A)]
(A-1): Phenotote YP-50S (bisphenol A type, manufactured by Nippon Steel & Sumikin Chemical Co., Ltd., Mw=40,000, hydroxyl equivalent=284 g/eq), melt viscosity at 250° C.=200 Pa·s, and Tg=83° C.

[Crosslinkable Curable Resin (B)]
Epoxy Resin
YSLV-80XY (Tetramethylbisphenol F type, manufactured by Nippon Steel & Sumikin Chemical Co., Ltd., epoxy equivalent=192 g/eq, and melting point=72° C.)

[Crosslinking Agent (C)]
Ethylene glycol bisanhydrotrimellitate: TMEG
(Acid Anhydride Equivalent: 207, and melting point: 160° C.)

Production Example 1

[Preparation of Phenoxy Resin CFRP Prepreg A]

A powder obtained by pulverizing and classifying A-1 and having an average particle diameter D50 of 80 μm, as a phenoxy resin (A), was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg A having a thickness of 0.65 mm, an elastic modulus of 75 [GPa], a maximum load of 13500 [N], and Vf (fiber volume content) of 60% was prepared.

Production Example 2

[Preparation of Phenoxy Resin GFRP Prepreg]

A powder obtained by pulverizing and classifying A-1 and having an average particle diameter D50 of 80 μm as a phenoxy resin (A), was powder coated to a plain woven reinforcing fiber base material made of glass fiber (cloth material: WEA 116E 106S 136 manufactured by Nitto Boseki Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin GFRP Prepreg having a thickness of 0.161 mm, an elastic modulus of 20 [GPa], a maximum load of 1470 [N], and Vf (fiber volume content) of 50% was prepared.

Production Example 3

[Preparation of Crosslinked Phenoxy Resin CFRP Prepreg A]

100 parts by mass of A-1 as a phenoxy resin (A), 30 parts by mass of a cross-linkable curable resin (B), and 73 parts by mass of a crosslinking agent (C) were prepared, and respectively pulverized and classified to form a powder having an average particle diameter D50 of 80 μm and the resulting powder was dry-blended using a dry powder mixer (a rocking mixer manufactured by Aichi Electric Co., Ltd.). The obtained crosslinkable phenoxy resin composition was powder coated to a plain-woven reinforcing fiber base material made of carbon fibers (cloth material: SA-3203, manufactured by Sakai Orbex Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, a crosslinkable Phenoxy Resin CFRP Prepreg A having a thickness of 0.65 mm, an elastic modulus of 75 [GPa], a maximum load of 17000 [N], and a resin content (RC) of 48% was prepared.

The melt viscosity at 250° C. of the crosslinkable phenoxy resin composition was 250 Pa·s. Regarding the Tg of the phenoxy resin after cross-linking and curing, a plurality of the prepared prepregs were stacked and pressed with a press machine heated to 200° C. at 3 MPa for 3 minutes to produce a 2 mm thick CFRP laminate, and then heated at 170° C. for 30 minutes. After this post-curing, a test specimen having a width of 10 mm and a length of 10 mm was cut out with a diamond cutter. It was measured at a temperature rise of 5° C./min in the range of 25 to 250° C. using a dynamic viscoelasticity measuring device (DMA 7e manufactured by Perkin Elmer). The local maximum peak of tan δ obtained was determined as Tg.

Production Example 4

[Preparation of Crosslinked Phenoxy Resin CFRP Prepreg B]

100 parts by mass of A-1 as a phenoxy resin (A), 30 parts by mass of a cross-linkable curable resin (B), 73 parts by mass of a crosslinking agent (C), and 120 parts by mass of the product number 181110 of CAS number #25038-54-4 manufactured by Aldrich as a nylon resin were prepared, and respectively pulverized and classified to form a powder having an average particle diameter D50 of 80 μm, and the resulting powder was dry-blended by a dry powder mixer (a rocking mixer manufactured by Aichi Electric Co., Ltd.). The resulting crosslinkable phenoxy resin composition was powder coated to a plain-woven reinforcing fiber base material made of carbon fibers (cloth material: SA-3203, manufactured by Sakai Orbex Co., Ltd.) in an electrostatic field under the conditions at a charge of 70 kV and a blowing air pressure of 0.32 MPa. Thereafter, the resin was heated and melted in an oven at 170° C. for 1 minute to thermally fuse the resin. As a result, Crosslinked Phenoxy Resin CFRP Prepreg B having a thickness of 0.65 mm, an elastic modulus of 75 [GPa], a maximum load of 18,500 [N], and a resin content (RC) of 48% was prepared.

Production Example 5

[Preparation of Polypropylene Film]

As a polypropylene resin, pellets of Novatec PP EA9 manufactured by Nippon Polypropylene Co., Ltd. were pressed by a press machine heated to 200° C. at 3 MPa for 3 minutes to prepare a 50 μm thick polypropylene resin film.

Production Example 6

[Preparation of Phenoxy Resin CFRP Prepreg C]

As a phenoxy resin (A), A-1 was pressed by a press machine heated to 200° C. at 3 MPa for 3 minutes to prepare a 200 μm-thick phenoxy resin sheet, and the resulting sheet and a plain-woven reinforced fiber base material made of carbon fibers (cloth material: SA-3203, manufactured by Sakai Orbex Co., Ltd.) were alternately stacked. The resulting stack was pressed at 3 MPa for 3 minutes using a press machine heated to 250° C. As a result, Phenoxy Resin CFRP Prepreg C having a thickness of 0.6 mm, an elastic modulus of 75 [GPa], a tensile load of 12000 [N] and Vf (fiber volume content) of 60% was prepared.

Production Example 7

[Preparation of Phenoxy Resin CFRP Prepreg D]

A powder obtained by pulverizing and classifying A-1 and having an average particle diameter D50 of 80 μm as a phenoxy resin (A) was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg D having a thickness of 1.0 mm, an elastic modulus of 75 [GPa], a maximum load of 19000 [N], and a Vf (fiber volume content) of 60% was prepared.

Production Example 8

[Preparation of Phenoxy Resin CFRP Prepreg E]

A powder obtained by pulverizing and classifying A-1 and having an average particle diameter D50 of 80 μm as a phenoxy resin (A) was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg E having a thickness of 1.08 mm, an elastic modulus of 75 [GPa], a maximum load of 2800 [N], and Vf (fiber volume content) of 60% was prepared.

Production Example 9

[Preparation of Phenoxy Resin CFRP Prepreg F]

As a phenoxy resin (A), a powder having an average particle diameter D50 of 80 μm obtained by pulverizing and classifying A-1 was applied to a reinforcing fiber base material made of carbon fibers (cloth material: IMS60, manufactured by Toho Tenax Co., Ltd.) by powder coating under the conditions of a charge of 70 kV and a blowing air pressure of 0.32 MPa. To the surface thereof, a mixture of a base material and a curing agent in a weight ratio of 100:30 of Alphatech 370 manufactured by Alpha Kogyo Co., Ltd. was applied in an amount of 3 g/m², and then heated and melted the resin in an oven at 170° C. for 1 minute to thermally fuse it to prepare a Phenoxy Resin CFRP Prepreg F having a thickness of 0.2 mm, an elastic coefficient of 68 [GPa], a maximum load of 3000 [N], and Vf (fiber volume content) of 54%.

[Metallic Members]

Metallic Member (M-1):
  Tin-free steel plate manufactured by Nippon Steel & Sumikin, Co. Ltd., 0.21 mm thick Metallic Member (M-2):
  Tin-free steel sheet manufactured by Nippon Steel & Sumikin Co. Ltd., 0.12 mm thick Metallic Member (M-3):
  Pure aluminum plate manufactured by The Nirako Corporation, 0.1 mm thick Metallic Member (M-4):
  Pure titanium plate manufactured by The Nirako Corporation, 0.1 mm thick Metallic Member (M-5):
  AZ31B alloy plate manufactured by Nippon Kinzoku Co., Ltd. 0.1 mm thick Metallic Member (M-6):
  Commercially available A5052 alloy plate, 0.6 mm thick Metallic Member (M-7):
  Hot-dip galvanized high-strength steel sheet manufactured by Nippon Steel & Sumikin Co., Ltd., 0.4 mm thick Example 1

M-1 was used as the metallic member 11 and the Phenoxy Resin CFRP Prepreg A of Production Example 1 was used as the FRP layer 12 to form samples of the metal-CFRP composite for a tensile test, a bending test and a shear test, having the structure shown in FIGS. 10, 11 and 12 by pressing at 3 MPa for 3 minutes using a press machine heated to 250° C. The thickness of the resin layer 101 was about 10 μm. After cooling, the obtained samples were subjected to a tensile test, a bending test and a shear test. Table 1 shows the results.

Example 2

Metal-CFRP composite samples were prepared in the same manner as in Example 1 except that M-2 was used as the metallic member 11. The thickness of the resin layer 101 was about 10 μm. After cooling, the obtained samples were subjected to a tensile test, a bending test and a shear test. Table 1 shows the results.

Example 3

Metal-CFRP composite samples were prepared in the same manner as in Example 1 except that M-3 sufficiently degreased with acetone was used as the metallic member 11. The thickness of the resin layer 101 was about 10 μm. After cooling, the obtained samples were subjected to a tensile test, a bending test and a shear test. Table 1 shows the results.

Example 4

Metal-CFRP composite sample were prepared in the same manner as in Example 1 except that M-4 sufficiently degreased with acetone was used as the metallic member 11. The thickness of the resin layer 101 was about 10 μm. After cooling, the obtained samples were subjected to a tensile test, a bending test and a shear test. Table 1 shows the results.

Example 5

Metal-CFRP composite samples were prepared in the same manner as in Example 1 except that M-5 sufficiently degreased with acetone was used as the metallic member 11. The thickness of the resin layer 101 was about 10 μm. After cooling, the obtained samples were subjected to a tensile test, a bending test and a shear test. Table 1 shows the results.

Example 6

Metal-CFRP composite samples were prepared in the same manner as in Example 1 except that the Phenoxy Resin GFRP Prepreg of Production Example 2 was used as the FRP layer 12. The thickness of the resin layer 101 was about 10 μm. After cooling, the obtained samples were subjected to a tensile test, a bending test and a shear test. Table 1 shows the results.

Example 7

Metal-CFRP composite samples were prepared in the same manner as in Example 1 except that the Polyamide CFRP Prepreg of FRP Prepreg was used as the FRP layer 12. The thickness of the resin layer 101 was about 10 μm. After cooling, the obtained samples were subjected to a tensile test, a bending test and a shear test. Table 1 shows the results.

Example 8

Metal-CFRP composite samples were prepared in the same manner as in Example 1 except that the Polycarbonate CFRP Prepreg of FRP prepreg was used as the FRP layer 12. The thickness of the resin layer 101 was about 10 μm. After cooling, the obtained samples were subjected to a tensile test, a bending test and a shear test. Table 1 shows the results.

Example 9

Metal-CFRP composite samples were prepared in the same manner as in Example 1 except that the Polypropylene CFRP Prepreg of FRP prepreg was used as the FRP layer 12. The thickness of the resin layer 101 was about 10 μm. After cooling, the obtained samples were subjected to a tensile test, a bending test and a shear test. Table 1 shows the results.

Example 10

Metal-CFRP composite samples were prepared in the same manner as in Example 1 except that the Crosslinked Phenoxy Resin CFRP Prepreg A of Production Example 3 was used as the FRP layer 12. The thickness of the resin layer 101 was about 10 μm. After cooling, the obtained samples were subjected to a tensile test, a bending test and a shear test. Table 1 shows the results.

Example 11

Metal-CFRP composite samples were prepared in the same manner as in Example 1 except that the Crosslinked Phenoxy Resin CFRP Prepreg B of Production Example 4 was used as the FRP layer 12. The thickness of the resin layer 101 was about 10 μm. After cooling, the obtained samples were subjected to a tensile test, a bending test and a shear test. Table 1 shows the results.

Example 12

Metal-CFRP composite samples were prepared in the same manner as in Example 1 except that M-7 sufficiently degreased with acetone was used as the metallic member 11 and the Phenoxy Resin CFRP Prepreg D of Production Example 7 was used as the FRP layer 12. The thickness of the resin layer 101 was about 10 μm. After cooling, the obtained samples were subjected to a tensile test, a bending test and a shear test. Table 1 shows the results.

Example 13

Metal-CFRP composite samples were prepared in the same manner as in Example 1 except that M-7 sufficiently degreased with acetone was used as the metallic member 11 and the Phenoxy Resin CFRP Prepreg E of Production Example 8 was used as the FRP layer 12. The thickness of the resin layer 101 was about 10 μm. After cooling, the obtained samples were subjected to a tensile test, a bending test and a shear test. Table 1 shows the results.

Example 14

Metal-CFRP composite samples were prepared in the same manner as in Example 1, except the points as follows. In order to quantitatively adhere the oil component to the surface of M-7 after sufficiently degreased with acetone, cup grease No. 1-3 manufactured by JX Nippon Oil Co., Ltd. was applied in an amount of 5 g/m$^2$ and the coated M-7 was used as the metallic member 11. On the surface thereof, Alphatech 370, an oil-surface bonding adhesive, manufactured by Alpha Kogyo Co., Ltd. was applied in an amount of 3 g/m$^2$. The Phenoxy Resin CFRP Prepreg E of Production Example 8 was used as the FRP layer 12. The thickness of the resin layer 101 was about 20 μm. After cooling, the obtained samples were subjected to a tensile test, a bending test and a shear test. Table 1 shows the results.

Example 15

Metal-CFRP composite samples were prepared in the same manner as in Example 1, except the points as follows. In order to quantitatively adhere the oil component to the surface of M-7 after sufficiently degreased with acetone, cup grease No. 1-3 manufactured by JX Nippon Oil Co., Ltd. was applied in an amount of 5 g/m$^2$ and the coated M-7 was used as the metallic member 11. The Phenoxy Resin CFRP Prepreg F of Production Example 9 was used as the FRP layer 12. The thickness of the resin layer 101 was about 20 μm. After cooling, the obtained samples were subjected to a tensile test, a bending test and a shear test. Table 1 shows the results.

Comparative Example 1

Torayca prepreg F6343B-05P manufactured by Toray Industries, Inc. (a plain woven base material of a PAN-based carbon fiber having an elasticity of 230 GPa impregnated with a thermosetting epoxy resin) was heat-pressed in an autoclave to form a CFRP. This was used as the FRP layer 12, M-1 was used as the metallic member 11 and Araldite Standard manufactured by Nichiban Co., Ltd., which is a two-part epoxy resin adhesive, was used as the resin layer 101 to form metal-CFRP composite samples for a tensile test, a bending test and a shear test having a structure shown in FIGS. 10, 11 and 12. The thickness of the resin layer 101 was about 15 μm. After cooling, the obtained samples were subjected to a tensile test, a bending test and a shear test. Table 2 shows the results.

Comparative Example 2

M-1 was used as the metallic member 11, the Phenoxy Resin CFRP Prepreg C of Production Example 6 was used as the FRP layer 12 and the polypropylene film prepared in Production Example 5 was used as the resin layer 101 to form metal-CFRP composite samples for a tensile test, a bending test and a shear test having a structure shown in FIGS. 10, 11 and 12 by pressing at 3 MPa for 3 minutes using a press machine heated to 200° C. That is, in Comparative Example 2, the resin layer 101 was not formed by leaching the resin from the FRP layer 12, but was formed by a separately prepared polypropylene film. The thickness of the resin layer 101 was about 40 μm. After cooling, the obtained samples were subjected to a tensile test, a bending test and a shear test. Table 2 shows the results.

Comparative Example 3

M-1 was used as the metallic member 11 and the Phenoxy Resin CFRP Prepreg A of Production Example 1 was used as the FRP layer 12 to form metal-CFRP composite samples for a tensile test, a bending test and a shear test having a structure shown in FIGS. 10, 11 and 12 by pressing at 3 MPa for 3 minutes using a press machine heated to 150° C. Almost no resin layer 101 could be confirmed. After cooling, the obtained samples were subjected to a tensile test, a bending test and a shear test. Table 2 shows the results.

Comparative Example 4

Metal-CFRP composite samples were prepared in the same manner as in Example 13, except the following points. In order to quantitatively adhere the oil component to the surface of M-7 after sufficiently degreased with acetone, cup grease No. 1-3 manufactured by JX Nippon Oil Co., Ltd. was applied in an amount of 5 g/m$^2$ and the coated M-7 was used as the metallic member 11. The thickness of the resin layer 101 was about 10 μm. After cooling, the obtained samples were subjected to a tensile test, a bending test and a shear test. Table 1 shows the results.

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| FRP Layer | Matrix Resin Type | A-1 | A-1 | A-1 | A-1 | A-1 | A-1 | Nylon | Polycarbonate | Polypropylene |
| | Glass Transition Temperature(° C.) | 83 | 83 | 83 | 83 | 83 | 83 | — | — | — |
| | Melt Viscosity(Pa · s) | 200 | 200 | 200 | 200 | 200 | 200 | — | — | — |
| | Fiber Type | Car. Fib. Cloth | Car. Fib. Cloth | Car. Fib. Cloth | Glass Fib. Cloth | Car. Fib. Cloth | Glass Fiber Cloth | Car. Fib. UD | Car. Fib. UD | Car. Fib. UD |
| | Thickness (mm) | 0.65 | 0.65 | 0.65 | 0.65 | 0.65 | 0.161 | 0.3 | 0.3 | 0.3 |
| | Elastic Modulus (GPa) | 75 | 75 | 75 | 75 | 75 | 20 | 110 | 110 | 110 |
| | Maximum Load B (N) | 13500 | 13500 | 13500 | 13500 | 13500 | 1470 | 3000 ✗ brittle fracture | 12500 | 5000 |
| Resin Layer | Resin Type | A-1 ✗ leaching out from FRP layer 12 | A-1 ✗ leaching out from FRP layer 12 | A-1 ✗ leaching out from FRP layer 12 | A-1 ✗ leaching out from FRP layer 12 | A-1 ✗ leaching out from FRP layer 12 | A-1 ✗ leaching out from FRP layer 12 | Nylon ✗ leaching out from FRP layer 12 | Polycarbonate ✗ leaching out from FRP layer 12 | Polypropylene ✗ leaching out from FRP layer 12 |
| | Glass Transition Temperature(° C.) | 83 | 83 | 83 | 83 | 83 | 83 | — | — | — |
| | Melt Viscosity(Pa · s) | 200 | 200 | 200 | 200 | 200 | 200 | — | — | — |
| | Phenoxy Proportion (parts of weight) | 100 | 100 | 100 | 100 | 100 | 100 | 0 | 0 | 0 |
| | Thickness (mm) | 0.01 | 0.01 | 0.01 | 0.01 | 0.01 | 0.01 | 0.01 | 0.01 | 0.01 |
| Metal Member | Metal Type | Soft Steel | Soft Steel | Pure Aluminum | Pure Ti | Mg ally | Soft Steel | Soft Steel | Soft Steel | Soft Steel |
| | Surface | TFS | TFS | none | none | none | TFS | TFS | TFS | TFS |
| | Thickness T1 (mm) | 0.21 × 2 | 0.12 × 2 | 0.1 × 2 | 0.1 × 2 | 0.1 × 2 | 0.21 × 2 | 0.21 × 2 | 0.21 × 2 | 0.21 × 2 |
| | Elastic Modulus E1(GPa) | 200 | 200 | 70 | 105 | 43 | 200 | 200 | 200 | 200 |
| | Maximum Load A1 (N) | 2000 × 2 | 1700 × 2 | 500 × 2 | 900 × 2 | 800 × 2 | 2000 × 2 | 2000 × 2 | 2000 × 2 | 2000 × 2 |
| | Load at elongation at break of Metal/FRP Composite A2 (N) | 1800 × 2 | 1500 × 2 | 470 × 2 | 840 × 2 | 700 × 2 | 1800 × 2 | 1800 × 2 | 1800 × 2 | 1800 × 2 |
| | Metal Peel | No | No | No | No | No | No | No | No | No |
| | Shear Strength (MPa) | 4.9 | 4.9 | 4.88 | 3.3 | 2.1 | 4.9 | 5.8 | 4.96 | 1 |
| | T1 × E1/T2 × E2 | 1.72 | 0.98 | 0.29 | 0.43 | 0.18 | 25.93 | 2.54 | 2.54 | 2.54 |
| | Maximum Load C(N) | 23000 | 22000 | 14500 | 16000 | 14000 | 7000 | 18500 | 20500 | 133000 |
| | Measures for Oil Film Problem | Yes | Yes | Yes | Yes | Yes | Yes | Yes | Yes | Yes |
| | Super-Law-of-Mixture, Criterion 1 | Yes | Yes | No | Yes | No | Yes | Yes | Yes | Yes |
| | Super-Law-of-Mixture, Criterion 2 | Yes | Yes | No | Yes | No | Yes | Yes | Yes | Yes |
| | Degree of Super-Law-of-Mixture, Criterion 1 | 1.31 | 1.30 | 1.00 | 1.05 | 0.93 | 1.28 | 2.64 | 1.24 | 1.48 |
| | Degree of Super-Law-of-Mixture, Criterion 2 | 1.35 | 1.33 | 1.00 | 1.05 | 0.94 | 1.38 | 2.80 | 1.27 | 1.55 |

| | | Ex. 10 | Ex. 11 | Ex. 12 | Ex. 13 | Ex. 14 | Ex. 15 |
|---|---|---|---|---|---|---|---|
| FRP Layer | Matrix Resin Type | CrosslinkableA | CrosslinkableB | A-1 | A-1 | A-1 | A-1 |
| | Glass Transition Temperature(° C.) | 183 | 190 | 83 | 83 | 83 | 83 |
| | Melt Viscosity(Pa · s) | 250 | 200 | 200 | 200 | 200 | 200 |
| | Fiber Type | Car. Fib. Cloth | Car. Fib. Cloth | Car. Fib. Cloth | Car. Fib. Cloth | Car. Fib. Cloth | Car. Fib. Cloth |
| | Thickness (mm) | 0.65 | 0.65 | 1 | 0.18 | 0.18 | 0.2 |
| | Elastic Modulus (GPa) | 75 | 75 | 75 | 75 | 75 | 68 |
| | Maximum Load B (N) | 17000 | 18500 | 19000 | 2800 | 2800 | 2800 |

-continued

| Resin Layer | Resin Type | Crosslinkable A X leaching out from FRP layer 12 | Crosslinkable B X leaching out from FRP layer 12 | A-1 | A-1 | A-1 | A-1 |
|---|---|---|---|---|---|---|---|
| | Glass Transition Temperature(° C.) | 183 | 190 | 83 | 83 | 83 | 83 |
| | Melt Viscosity(Pa · s) | 250 | 200 | 200 | 200 | 200 | 200 |
| | Phenoxy Proportion (parts of weight) | 80 | 50 | 100 | 100 | 100 | 78 |
| | Thickness (mm) | 0.01 | 0.01 | 0.01 | 0.01 | 0.02 | 0.02 |
| Metal Member | Metal Type | Soft Steel | Soft Steel | High Strength Steel | High Strength Steel | High Strength Steel | High Strength Steel |
| | Surface | TFS | TFS | Hot-Dip Galvanizing | Hot-Dip Galvanizing | Hot-Dip Galvanizing | Hot-Dip Galvanizing |
| | Thickness T1 (mm) | 0.21 × 2 | 0.21 × 2 | 0.42 | 0.42 | 0.42 | 0.42 |
| | Elastic Modulus E1(GPa) | 200 | 200 | 200 | 200 | 200 | 200 |
| | Maximum Load A1 (N) | 2000 × 2 | 2000 × 2 | — | — | — | — |
| | Load at elongation at break of Metal/FRP Composite A2 (N) | 1800 × 2 | 1800 × 2 | 4500 | 4500 | 4500 | 4500 |
| | Metal Peel | No | No | No | No | No | No |
| | Shear Strength (MPa) | 3.3 | 2.4 | 4.9 | 4.9 | 4.9 | 4.9 |
| | T1 × E1/T2 × E2 | 1.72 | 1.72 | 1.12 | 6.22 | 6.22 | 6.22 |
| | Maximum Load C(N) | 23500 | 25000 | 25000 | 7980 | 7530 | 7870 |
| | Measures for Oil Film Problem | Yes | Yes | Yes | Yes | Yes | Yes |
| | Super-Law-of-Mixture, Criterion 1 | Yes | Yes | — | — | — | — |
| | Super-Law-of-Mixture, Criterion 2 | Yes | Yes | Yes | Yes | Yes | Yes |
| | Degree of Super-Law-of-Mixture, Criterion 1 | 1.12 | 1.11 | — | — | — | — |
| | Degree of Super-Law-of-Mixture, Criterion 2 | 1.14 | 1.13 | 1.06 | 1.09 | 1.03 | 1.08 |

TABLE 2

|  |  | Comp. Ex. 1 | Comp. Ex. 2 | Comp. Ex. 3 | Comp. Ex. 4 |
|---|---|---|---|---|---|
| FRP Layer | Matrix Resin Type | Thermosetting | A-1 | A-1 | A-1 |
|  | Glass Transition Temperature (Tg) | — | 83 | 83 | 83 |
|  | Melt viscosity (Pa·s) | — | 200 | 200 | 200 |
|  | Fiber Type | Car. Fib. Cloth | Car. Fib. Cloth | Car. Fib. Cloth | Car. Fib. Cloth |
|  | Thicknes (mm) | 0.65 | 0.65 | 0.65 | 0.18 |
|  | Elatic Modulus E2 (GPa) | 69 | 75 | 75 | 75 |
|  | Maximum Load B (N) | 9000 | 12000 | 13500 | 2800 |
| Resin Layer | Resin Type | Araldite | Propylene Film | Almost None ✗ No leaching out from FRP Layer 12 | A-1 |
|  | Glass Transition Temperature (Tg) | — | — | — | 83 |
|  | Melt Viscosity (Pa·s) | — | — | — | 200 |
|  | Phenoxy Proportion (parts of weight) | 0 | 0 | — | 100 |
|  | Thickness (mm) | 0.015 | 0.04 | — | 0.01 |
| Metal Member | Metal Type | Soft Steel | Soft Steel | Soft Steel | High Strength Steel |
|  | Surface | TFS | TFS | TFS | Hot-Dip Galvanizing |
|  | Thickness T1 (mm) | 0.21 × 2 | 0.21 × 2 | 0.21 × 2 | 0.42 |
|  | Elastic Modulus E1 (GPa) | 200 | 200 | 200 | 200 |
|  | Maximum Load A1 (N) | 2000 × 2 | 2000 × 2 | 2000 × 2 | 6700 |
|  | Load at elongation at break of Metal/FRP Composite A (N) | 1800 × 2 | 1800 × 2 | 1800 × 2 | 4500 |
|  | Metal Peel | Yes | Yes | Yes | Yes |
|  | Shear Strength (MPa) | 1.92 | Impossible to Measure | 0.6 | 0.5 |
| T1 × E1/T2 × E2 |  | 1.76 | 1.83 | 1.72 | 6.22 |
| Maximum Load C (N) |  | 12800 | When Cut, Peeling Occur, Impossible to Measure | When Cut, Peeling Occur, Impossible to Measure | 7000 |
| Measure of Oil Film Problem |  | Yes | Yes | Yes | No |
| Super-Law-of-Mixture, Criterion 1 |  | No | No | No | No |
| Super-Law-of-Mixture, Criterion 2 |  | No | No | No | No |
| Degree of Super-Law-of-Mixture, Criterion 1 |  | 0.98 | — | — | 0.74 |
| Degree of Super-Law-of-Mixture, Criterion 2 |  | 1.00 | — | — | 0.96 |

As can be seen from Tables 1 and 2, Examples 1 to 15 in which the resin layer 101 was provided by the same type of resin as the matrix resin 102 of the thermoplastic resin of the FRP layer 12, and an oil film countermeasure (degreasing or treatment using an oil surface bonding adhesive) is performed, was compared with Comparative Example 1 in which the matrix resin 102 and the resin layer 101 were a thermosetting resin, Comparative Example 2 in which the matrix resin 102 and the resin layer 101 were not the same type of resin, Comparative Example 3 in which the resin layer 101 could hardly be confirmed, Comparative Example 4 in which the oil component adhered to the surface of the metallic member 11 and no oil film countermeasure was taken. In Examples 1 to 15, metal peeling did not occur, and the metallic member 11 and the FRP layer 12 were better adhered and integrated. Examples 1 to 15 have more excellent workability and mechanical properties. All of the comparative examples experienced metal peeling. It was confirmed that metal peeling occurred regardless of the type of oil used in the comparative examples. The elastic modulus E2 in Formula (1) was calculated based on the law of mixture, with the elastic modulus of the resin layer being 2 GPa. However, in Comparative Examples 1 to 3, the elastic modulus of the resin layer was set to 0.

Although the preferred embodiments of the present invention have been described above in detail with reference to the accompanying drawings, the present invention is not limited to such examples. It is apparent that those skilled in the art to which the present invention pertains can conceive various changes or modifications within the scope of the technical thought described in the claims. It is understood that these changes and modifications also naturally belong to the technical scope of the present invention.

EXPLANATION OF SYMBOLS

1 Metal-FRP composite
11 Metallic member
12, 13 FRP Layer
20 Coating Film
20A Resin Sheet
21 FRP Molding Prepreg
101 Resin Layer
102 Matrix Resin
103 Reinforcing Fiber Material
104 Reinforced Fiber Base Material
104A Resin-adhered Fiber Base Material
105 Fine Powder
105A Partially Fused Structure
106 Prepreg

The invention claimed is:

1. A metal-fiber-reinforced resin material composite comprising a metallic member and a fiber-reinforced resin material laminated on at least one surface of the metallic member to form a composite with the metallic member,
wherein the fiber-reinforced resin material has
a matrix resin containing a thermoplastic resin,
a reinforcing fiber material contained in the matrix resin,
a resin layer interposed between the reinforcing fiber material and the metallic member, and made of the same type of resin as said matrix resin,
wherein a shear strength between the metallic member and the fiber-reinforced resin material is 0.8 MPa or more.

2. The metal-fiber-reinforced resin material composite according to claim 1, wherein the maximum load of the metal-fiber-reinforced resin material composite exhibits a super-law-of-mixture.

3. The metal-fiber-reinforced resin material composite according to claim 1, wherein the matrix resin contains, as the thermoplastic resin, one or more selected from the group consisting of a phenoxy resin (A), a polyolefin and an acid-modified product thereof, a polycarbonate, a polyamide, a polyester, a polystyrene, vinyl chloride, an acrylic, a polyetheretherketone and a polyphenylene sulfide.

4. The metal-fiber-reinforced resin material composite according to claim 3, wherein the matrix resin contains 50 parts by mass or more of the phenoxy resin (A) with respect to 100 parts by mass of the resin component.

5. The metal-fiber-reinforced resin material composite according to claim 1, wherein the resin constituting the resin layer is made of a crosslinked cured product, and the glass transition temperature of the crosslinked cured product is 160° C. or higher.

6. The metal-fiber-reinforced resin material composite according to claim 1, wherein the resin layer is a layer in which the content of fibers detached from the reinforcing fiber material is 5% by mass or less, and the thickness of the layer is 20 μm or less.

7. The metal-fiber-reinforced resin material composite according to claim 1, wherein the total thickness T1 of the metallic member and the elastic modulus E1 of the metallic member, and the total thickness T2 of the fiber-reinforced resin material and the elastic modulus E2 of the fiber-reinforced resin material satisfy the relationship of Formula (1) as described below, $$(T1 \times E1)/(T2 \times E2) > 0.3 \qquad \text{Formula (1)}.$$

8. The metal-fiber-reinforced resin material composite according to claim 1, wherein the material of the metallic member is a steel material, an iron-based alloy, titanium or aluminum.

9. The metal-fiber-reinforced resin material composite according to claim 8, wherein the steel material is a hot-dip galvanized steel sheet, an electro-galvanized steel sheet or an aluminum-plated steel sheet.

10. A metal-fiber reinforced resin material composite comprising a metallic member and a fiber reinforced resin material laminated on at least one surface of the metallic member to form a composite with the metallic member,
wherein the fiber-reinforced resin material has
a matrix resin containing a thermoplastic resin,
a reinforcing fiber material contained in the matrix resin,
a resin layer interposed between the reinforcing fiber material and the metallic member, and made of the same type of resin as said matrix resin,
wherein the matrix resin contains 50 parts by mass or more of the phenoxy resin (A) with respect to 100 parts by mass of the resin component, and is a crosslinked cured product of a crosslinking resin composition comprising a crosslinkable curable resin (B) in a range of 5 parts by mass or more and 85 parts by mass or less with respect to 100 parts by mass of the phenoxy resin (A).

11. The metal-fiber-reinforced resin material composite according to claim 10, wherein the maximum load of the metal-fiber-reinforced resin material composite exhibits a super-law-of-mixture.

12. The metal-fiber-reinforced resin material composite according to claim 10, wherein a shear strength between the metallic member and the fiber-reinforced resin material is 0.8 MPa or more.

13. The metal-fiber-reinforced resin material composite according to claim 12, wherein before and after the matrix resin and the resin constituting the resin layer change from the solidified product in the first cured state to the crosslinked cured product in the second cured state by heating, the glass transition temperature changes, and a shear strength between the metallic member and the fiber-reinforced resin material after heating is 0.8 MPa or more.

14. The metal-fiber-reinforced resin material composite according to claim 10, wherein the resin layer is a layer in which the content of fibers detached from the reinforcing fiber material is 5% by mass or less, and the thickness of the layer is 20 μm or less.

15. The metal-fiber-reinforced resin material composite according to claim 10, wherein the total thickness T1 of the metallic member and the elastic modulus E1 of the metallic member, and the total thickness T2 of the fiber-reinforced resin material and the elastic modulus E2 of the fiber-reinforced resin material satisfy the relationship of Formula (1) as described below, $$(T1 \times E1)/(T2 \times E2) > 0.3 \qquad \text{Formula (1)}.$$

16. The metal-fiber-reinforced resin material composite according to claim 10, wherein the material of the metallic member is a steel material, an iron-based alloy, titanium or aluminum.

17. The metal-fiber-reinforced resin material composite according to claim 16, wherein the steel material is a hot-dip galvanized steel sheet, an electro-galvanized steel sheet or an aluminum-plated steel sheet.

* * * * *